United States Patent
Clements et al.

(10) Patent No.: US 11,966,878 B2
(45) Date of Patent: Apr. 23, 2024

(54) MULTI-ENTITY PLATFORM USING UNIFORM LABELING OF DATA PRODUCTS AND SERVICES

(71) Applicant: VendEx Solutions, Inc., San Francisco, CA (US)

(72) Inventors: Richard Fitzhugh Clements, San Francisco, CA (US); Michele Irene Kelsey, Murrells Inlet, SC (US)

(73) Assignee: Vendex Solutions, Inc., San Francisco, CA (US)

( * ) Notice: Subject to any disclaimer, the term of this patent is extended or adjusted under 35 U.S.C. 154(b) by 0 days.

(21) Appl. No.: 18/204,086

(22) Filed: May 31, 2023

(65) Prior Publication Data
US 2023/0394434 A1    Dec. 7, 2023

Related U.S. Application Data

(60) Provisional application No. 63/347,830, filed on Jun. 1, 2022.

(51) Int. Cl.
G06Q 10/0875    (2023.01)
G06Q 10/083    (2023.01)

(52) U.S. Cl.
CPC ....... *G06Q 10/0875* (2013.01); *G06Q 10/083* (2013.01)

(58) Field of Classification Search
CPC .......................... G06Q 10/0875; G06Q 10/083
See application file for complete search history.

(56) References Cited

U.S. PATENT DOCUMENTS

| | | | |
|---|---|---|---|
| 2007/0073734 A1 | 3/2007 | Doan | |
| 2016/0203319 A1* | 7/2016 | Coen | G06Q 30/0185 726/25 |
| 2020/0349277 A1 | 11/2020 | Torbey | |
| 2020/0381091 A1 | 12/2020 | Granvold | |
| 2021/0343401 A1 | 11/2021 | Joseph | |
| 2022/0156235 A1 | 5/2022 | Ly | |

OTHER PUBLICATIONS

Zebra, "Zebra Solutions Pathway", 2020, https://www.zebra.com/content/dam/zebra_new_ia/en-us/corporate-and-brand/connected-commerce/guide/zsp-guide-solutions-pathway-recent-updates-en-us.pdf (Year: 2020).*

(Continued)

*Primary Examiner* — Allen C Chein
(74) *Attorney, Agent, or Firm* — Nixon Peabody LLP

(57) ABSTRACT

Systems and methods for automatically managing and utilizing the uniform labeling of data packages are disclosed. Specification information can describe many aspects of a data package, and can be analyzed to automatically identify various product attributes and service attributes usable to define the data package. Each of the individual product attributes and service attributes can be encoded into an alphanumeric code, which can be concatenated together to form a single uniform package identifier (UPID) usable to describe the associated data product. Systems and methods can automatically generate UPIDs, automatically find data packages based on search UPIDs, automatically process invoices based on UPIDs, and otherwise leverage the UPIDs to automate the collection, creation, selling, purchasing, trading, redistribution, and/or using of data packages.

20 Claims, 9 Drawing Sheets

(56) References Cited

OTHER PUBLICATIONS

Gorgias, "Free SKU generator", Dec. 3, 2020, http://web.archive.org/web/20201203012926/https://www.gorgias.com/tools/ sku-generator (Year: 2020).*

Neev, "Magento extension SKU Auto Generator", https://www.magecloud.net/marketplace/extension/sku-auto-generator/ (Year: 2017).*

"How can I select matching column names between multiple tables?", Sep. 2019, https://stackoverflow.com/questions/57812082/how-can-i-select-matching-column-names-between-multiple-tables, hereinafter Stackoverflow (Year: 2019).*

Llic, Marija, "SQL Join Types Explained", Nov. 2020, https://learnsql.com/blog/sql-joins-types-explained/ (Year: 2020).*

International Search Report and Written Opinion issued in WO 2023/235748 dated Nov. 9, 2023.

* cited by examiner

MULTI-ENTITY PLATFORM USING UNIFORM LABELING OF DATA PRODUCTS AND SERVICES

CROSS-REFERENCE TO RELATED APPLICATIONS

The present application claims the benefit of U.S. Provisional Patent Application No. 63/347,830 filed Jun. 1, 2022, and entitled "MULTI-ENTITY PLATFORM USING UNIFORM LABELING OF DATA PRODUCTS AND SERVICES," which is hereby incorporated by reference in its entirety.

TECHNICAL FIELD

The present disclosure relates to data sharing platforms generally and more specifically to the generation of and decoding of uniform labeling for data products and services.

BACKGROUND

Entities across many industries offer products and services related to those products, with some entities offering extremely large numbers of particular products and services each with minor variations. Further, these products and services, even if originating from the same entity, may be ultimately provided by various redistributors. Keeping track and accurately identifying the products and services that are created, purchased, sold, traded, redistributed, used, or otherwise handled often poses a significant burden on any parties involved, which can increase the overhead and operational risk involved in making use of such products and services.

Because different entities involved often use their own identifiers and descriptors to keep track of their own products and services, this problem is exacerbated. For example, two entities providing data products to a consumer may use the same identifier, although the two data products are different, thus forcing the consumer to use their own identifiers to differentiate the two data products. In another example, two entities may use entirely different descriptors to describe certain aspects, features, capabilities, and limitations of their data product, thus forcing the consumer to manually compare the data product descriptors from each entity to identify any similarities or differences. Similarly, when a consumer needs to track that a particular product or service that was provided matches that which was ordered, the consumer would need to manually compare the received product or service with that entity's descriptors to identify differences.

When attempting to automate systems to allow an entity or an industry to grow in size and/or handle the large amounts of different products and services, these and other problems can make automation ineffective and inefficient, especially when manual, human review is required, interrupting automation attempts.

In the field of data products specifically, the accumulation and complexity of data is ever-increasing, making the organization of the products and services surrounding data sets difficult to manage across entities. When data products are sold, bought, or otherwise distributed, the parties involved rely on complex and explicit descriptions of the data products. For example, a particular data product may cover a certain subject matter over a certain timeframe with a certain frequency of collection. Many other specifications can be used to describe any particular data product. Since each vendor can describe their data product in their own fashion, much confusion is created, for example when a potential consumer wishes to compare two data products from different vendors. Further, different vendors may assign entirely unique and non-similar product identifiers for the same data product, which serves to increase confusion. Thus, it can be very difficult to accurately track the creation, use, sale, trading, redistribution and purchase of data products. Current techniques rely on matching vendor-specific product identifiers with vendor-specific product lists and descriptions to obtain specification information, pricing, and other information associated with the data product.

There is a need for an improved system for uniformly labeling products and services, such as data products and services. There is a need for a platform capable of facilitating the creation, use, sale, trade, redistribution and purchase of products and services in a uniform fashion, across multiple entities (e.g., multiple providers and consumers). There is a need for improved handling and conveying of important information from product descriptions.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method. The method comprises receiving, at a computing device, specification information for a data product, the data product including a collection of data provided for further analysis or relying on the collection of data. The method further comprises determining a plurality of product attributes based at least in part on the specification information. The method further comprises identifying, for each of the plurality of product attributes, an alphanumeric product attribute code. The method further comprises generating a uniform package identifier (UPID) for the data product based at least in part on the plurality of alphanumeric product attribute codes, wherein the UPID is alphanumeric, and wherein the UPID includes each of the plurality of alphanumeric product attribute codes.

In some cases, the method further comprises determining a provider identifier based at least in part on the specification information, the provider identifier indicative of a provider of the data product; and identifying an alphanumeric provider code based at least in part on the provider identifier, wherein generating the UPID is further based at least in part on the alphanumeric provider code, and wherein the UPID includes the alphanumeric provider code and the plurality of alphanumeric product attribute codes.

In some cases, the method further comprises determining hierarchy information associated with the provider, the hierarchy information indicative of the hierarchical position of the provider with respect to one or more corporate affiliates of the provider; and identifying an alphanumeric hierarchy code based at least in part on the hierarchy information, wherein generating the UPID is further based at least in part on the alphanumeric hierarchy code, and wherein the UPID includes the alphanumeric provider code and the hierarchy code.

In some cases, the plurality of product attributes includes a product code, wherein, for each of a plurality of potential providers of potential data products, the product code is uniquely indicative of a specific data product of the given potential provider. In some cases, the plurality of product attributes includes a delivery method code, wherein the delivery method code is indicative of a storage form for delivery of the data product, a route of delivery for delivery of the data product, or a combination thereof. In some cases, the plurality of product attributes includes a delivery frequency code, wherein the delivery frequency code is indicative of the frequency of delivery or delay of delivery from the provider to the consumer associated with the data product. The delivery frequency code may also be referred to as a delivery timing code. In some cases, the plurality of product attributes includes a solution code, wherein the solution code is indicative of a targeted use associated with the data product. In some cases, the plurality of product attributes includes a classification code, wherein the classification code is indicative of one or more targeted use cases associated with the solution code. In some cases the plurality of product attributes includes a geography code attribute indicative of but not limited to a geographical region, country, state, municipality, city, or town associated with the data product.

In some cases, the data product is associated with one or more service attributes, wherein the method further comprises determining the one or more service attributes based at least in part on the specification information; and identifying, for each of the one or more service attributes, an alphanumeric service attribute code, wherein generating the UPID is further based at least in part on the alphanumeric service attribute code, and wherein the UPID includes the alphanumeric service attribute code and the plurality of alphanumeric product attribute codes. In some cases, the one or more service attributes includes: i) a data originator attribute indicative of an entity that directly provided (in some cases redistributed) the data product to the consumer, which may or may not be the original creator (data source) of the data product; ii) a data source attribute indicative of an entity that represents the original creator and source of the data product, which may or not be the entity that directly provided the data product to the consumer; iii) a content frequency attribute indicative of the timing and frequency of update of the content of the data product. This service attribute of content frequency is distinct from, and in many cases may not be the same as, the product attribute of product delivery frequency; iv) a metadata presence attribute indicative of whether additional metadata is included with the data product to define and track usage and movement of the data product; v) one or more modifying attributes indicative of supplemental characteristics associated with the data product. These modifying attributes identify, in detail, characteristics and elements that describe the data product, and provides uniformity to create a common reference between providers and consumers. These modifying attributes may include but are not limited to category type, instrument, tenor, currency, industry, language, included fields, and other characteristics that may be specific to the data sector; vi) any combination of i-v.

In some cases, the UPID may be driven by "waterfalls" or combinations of solutions, classifications, and other fields, such that the combinations of certain selections drive the fields and ordering of the modifying attributes that follow. Similarly, fields which are positioned further down the progression of the waterfall are predeterminately defined by the fields that precede. That is to say that Field B is predetermined by Field A and certain fields that precede. For example, if the selected solution is "pricing" and the selected classification is "foreign exchange" this selection will drive the content of the fields that follow; similarly, the fields further down the progression are predetermined by the earlier fields.

In some cases, certain modifying attribute fields and certain other fields in the UPID may be defined to only allow for one selection.

In some cases, certain modifying attribute fields and certain other fields in the UPID may allow for multiple entries, or "baskets." Baskets are groupings of information where the information contained therein is not mutually exclusive. In such cases it would be incorrect to consider or search as individual data points; the basket is what defines the data field. An example of this situation in financial services is indices, where groupings such as geographies and industries are often used, and the grouping, not the individual data points, form the definition of the data package. As used herein, a basket can be considered a product attribute or service attribute that itself includes a set of component attributes.

In some cases, a basket can be represented by the presence of multiple instances of a single type of code, such as multiple instances of a geography code. In some cases, a unique "basket" code can be used to indicate that the following n number of codes are to be interpreted as a basket. As used herein, the "basket" code that indicates a basket is being used can be known as a basket meta-code, while the underlying codes that makeup the items in the basket can be known as basket component codes. Thus, a basket can be represented in the UPID as a basket meta-code followed by multiple basket component codes. For example, a UPID for a data product that includes a basket of three countries for its geography code field can have a geography code field consisting of: i) a first code indicating the following three codes are a basket of geography codes; ii) a second code indicating the first country; iii) a third code indicating the second country; and iv) a fourth code indicating the third country. The location of the basket meta-code need not always precede the basket component codes, in which case the system interpreting or constructing the UPID may treat the codes making up the basket as basket component codes once the basket meta-code is known.

In some cases, a basket can be represented by a single code that itself represents a basket of codes. Such a code can be referred to as a basket combination code. In an example using the above situation where a UPID is to indicate a basket of three countries for its geography code field, the geography code field of the UPID may contain a single basket combination code that encodes for a basket of countries A, B, and C.

In some cases, a basket can be represented merely by the presence of multiple codes. In an example using the above situation where a UPID is to indicate a basket of three countries for its geography code field, the UPID may simply contain three geography codes. A system creating or interpreting the UPID may know to interpret the three geography codes as a basket when geography codes are distinguishable from other codes in the UPID. For example, if a geography code always begins with a number and is always six characters long, but no other type of code in the UPID begins with a number and is six characters long, it can be inferred that the presence of multiple codes that begin with a number and are six characters long is to be interpreted as a basket of geographies.

In some cases, the UPID includes a coding portion and a check value, wherein generating the UPID further includes generating the check value based at least in part on the coding portion of the UPID, the check value usable to identify the validity of the coding portion.

In some cases, the UPID is a search UPID, the method further comprising generating a list of one or more potential data products based on the search UPID, wherein each of the one or more potential data products is associated with a respective potential data product UPIDs, and wherein each of the respective potential data product UPIDs includes the search UPID. The method further comprises receiving user input indicative of a selected data product from the list of one or more potential data products. The method further comprises facilitating receipt of the selected data product in response to receiving the user input.

In an example, the search UPID may be a string comprising or consisting of one or more codes as disclosed herein, such as a data source code and a content delivery frequency code. This search UPID can then be used to search for potential data product UPIDs that contain the search UPID (e.g., contain the particular data source code and content delivery frequency code of the search UPID). Thus, any potential data product UPID that contains the search UPID will fit the parameters of the search. The search UPID can be a full UPID (e.g., with all possible product attribute codes and service attribute codes), a partial UPID containing one or more codes (e.g., with one or more codes, such as provider codes, hierarchy codes, data originator codes, etc.), or a partial UPID containing one or more partial codes (e.g., with at least a portion of one or more codes).

In some cases, to search for a basket (e.g., a collection of countries), the search UPID may contain, as appropriate, i) a basket meta-code and associated basket component codes; ii) a basket combination code; or iii) a collection of multiple codes for the same code type (e.g., multiple geography codes). In such cases, the potential data product UPIDs would contain the search UPID.

In some cases, to search for baskets that contain at least one or more particular entries, the search UPID may contain, as appropriate, i) a partial basket meta-code (e.g., a portion of a basket meta-code indicating a basket is being used, but leaving off the portion indicating how many codes are in the basket) and the basket component code(s) for the one or more particular entries; ii) a portion of a basket combination code that is the same for all basket combination codes containing the one or more particular entries; iii) a series of all basket combination codes (e.g., performed via multiple iterations of the search UPID) that encode for the one or more particular entries; or iv) the code(s) for the one or more particular entries.

In some cases, searching for a single code (e.g., a single geography code) can default to only returning results that are not baskets. Thus, if a search is conducted for a geography code for country A, data product UPIDs that include a basket where one of the entries is for country A would not be identified as a match. In some cases, this default is inherent due to the type of basket encoding performed (e.g., when basket combination codes are used that are different from the geography code for country A). In some cases, the system will identify data product UPIDs as containing a basket and will exclude them from being matched with the search UPID. Such a default may be overcome (e.g., via user selection) by automatically also searching for basket combination codes associated with the single code being searched (e.g., via additional iterations of search UPIDs), or by not excluding data product UPIDs that otherwise indicate a basket from matching the search UPID.

In some cases, the UPID is a search UPID, the method further comprising generating a list of one or more potential data products based on the search UPID, wherein each of the one or more potential data products is associated with a respective potential data product UPIDs, and wherein each of the respective potential data product UPIDs includes the search UPID. The method further comprises extracting, for each of the one or more potential data products, one or more potential product attributes. The method further comprises identifying a selected data product based at least in part on the one or more potential product attributes for each of the one or more potential data products. The method further comprises facilitating receipt of the selected data product in response to determining the selected data product.

In some cases, the UPID is a search UPID, the method further comprising accessing a list of available data products, each of the available data products being associated with a respective available data product UPID. The method further comprises determining that none of the available data product UPIDs include the search UPID. The method further comprises identifying a combination product based at least in part on the search UPID and the available data product UPIDs, wherein the combination product is a combination of a plurality of the available data products such that the data provided by the combination of the plurality of available data products satisfies the specification information associated with the search UPID.

In some cases, receiving the specification information includes receiving an open text input and parsing the open text input to extract the specification information. In some cases, the method further comprises generating an invoice based at least in part on the UPID, wherein generating the invoice includes accessing the UPID; identifying a price associated with the UPID; and preparing the invoice using the price associated with the UPID. In some cases, identifying the price associated with the UPID includes identifying, for one or more of the plurality of product attributes, pricing information associated with the respective product attribute; and calculating the price associated with the UPID based at least in part on the pricing information for each of the one or more of the plurality of product attributes.

In some cases, receiving the specification information includes receiving the data product and analyzing the data product to automatically extract the specification information from the data product. In some cases, the method further comprises receiving a target data product; analyzing the target data product to automatically extract a target specification information; and comparing the data product and the target data product using the UPID. In some cases, comparing the data product and the target data product using the UPID includes: determining a plurality of target product attributes based at least in part on the target specification information; generating a target UPID for the target data product based at least in part on the plurality of target product attributes; and comparing the UPID with the target UPID. In some cases, comparing the data product and the target data product using the UPID includes: decoding the UPID to extract a set of decoded product attributes, wherein the decoded set of product attributes match the plurality of product attributes; determining decoded specification information for the data product based at least in part on the decoded set of product attributes; and comparing the decoded specification information with the target specification information.

In some cases, the method further comprises receiving an alphanumeric string, wherein the alphanumeric string is usable to generate the UPID; determining that the alphanumeric string contains an undesired string; adjusting at least one alphanumeric character of the alphanumeric string to avoid the undesired string; and using the adjusted alphanumeric string in the generation of the UPID. In some cases, the alphanumeric string is i) at least a portion of at least one of the plurality of alphanumeric product attribute codes; ii) at least a portion of an alphanumeric provider code; or iii) at least a portion of an alphanumeric service attribute code.

In some cases, receiving the specification information occurs in response to receiving a user input, and wherein the method further comprises presenting the UPID using an output device coupled to the computing device.

Embodiments of the present disclosure further include a system comprising a control system including one or more processors; and a memory having stored thereon machine readable instructions; wherein the control system is coupled to the memory, and the aforementioned method(s) is implemented when the machine executable instructions in the memory are executed by at least one of the one or more processors of the control system.

Embodiments of the present disclosure further include a system for uniquely identifying data products, the system including a control system configured to implement the aforementioned method(s).

Embodiments of the present disclosure further include a computer program product comprising instructions which, when executed by a computer, cause the computer to carry out the aforementioned method(s). In some cases, the computer program product is a non-transitory computer readable medium.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
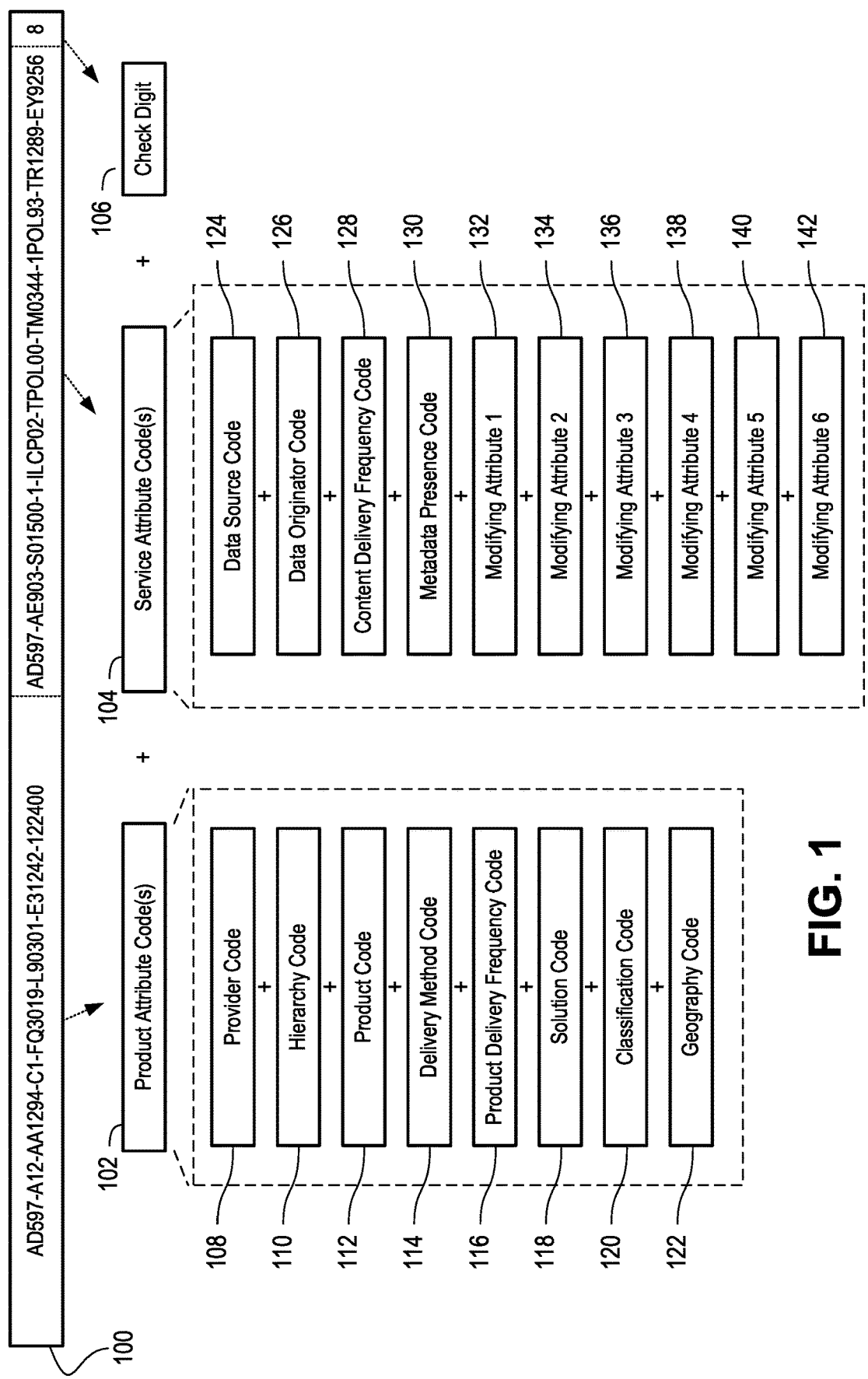
FIG. 1 is a schematic diagram depicting an example uniform package identifier (UPID) and its subcomponents, according to certain aspects of the present disclosure.

Certain aspects and features of the present disclosure relate to systems and methods for automatically managing and utilizing the uniform labeling of data packages. Data packages can be defined by specification information describing many aspects of the underlying data products and/or services associated with the data. This specification information can be analyzed to automatically identify various product attributes and service attributes used to define the data package. Each of the individual product attributes and service attributes can be encoded into an alphanumeric code, which can be concatenated together to form a single uniform package identifier (LIPID) usable to describe the associated data package. Systems and methods can automatically generate UPIDs, automatically find data packages based on search UPIDs, automatically process invoices based on UPIDs, and otherwise leverage the UPIDs to automate the collection, creation, selling, purchasing, trading, redistributing, and/or use of data packages.

As used herein, the term package is intended to include both or either of i) products, and ii) services associated with those products. For example, the term data package is intended to include both or either of data products (e.g., collections of data) and services associated with such data products (e.g., updating data and content on a daily basis). Data products and services include data and services in all forms, including but not limited to digitized data, data feeds, desktop platforms, websites, print data, video, news, legal and accounting and other related services. Data products and services also include automated and technical solutions to address data workflow and complex data handling, including those used for legal and regulatory requirements.

Certain aspects and features of the present disclosure are particularly useful for managing data packages. However, certain aspects and features of the present disclosure can be used across many other fields as well, such as analytics, news, charts, videos, including but not limited to motion pictures, legal services, accounting services, movies, television, or any other distribution of products and services.

For illustrative purposes, data packages (e.g., data products and/or data services) will be used herein to describe features and aspects of the present disclosure, however, unless explicitly disclaimed, such features and aspects can be used for other types of packages (e.g., software products and/or packages, technical solutions, or other types of products and/or services), with appropriate modification, as needed.

A data product is intended to include a collection of data that has been acquired for a particular subject matter, such as prices of a commodity or temperatures of a geographical region over time. As an example, a data product may be a database containing the frequency of use of the hundred most commonly used words in a particular publication. A service associated with a data product can be any service that is associated with acquiring, providing, or otherwise using a data product. As an example, a service can include the providing of a particular data product on a monthly basis. Other products and services can be used.

In some cases, a product can be referred to as a static product or a dynamic product. A static product is a product that does not change over time (e.g., historical prices of a stock within a limited timeframe in the past). A dynamic product is a product that does change over time (e.g., current prices of the same stock). A static data product can be provided in its entirety, such as via a single file, although that need not always be the case. A dynamic data product can be provided across multiple deliveries at any suitable frequency, although that does not need to be the case.

As used herein, "providing" and "distributing" can be performed actively or passively. Actively providing or distributing a product can include expressly transmitting or otherwise sending a product to a recipient (e.g., emailing the product to the recipient). Passively providing or distributing a product can include making the product available to the recipient (e.g., making the product available for the recipient to download).

As providers of data packages (e.g., data product vendors) accumulate more and more data packages that can be provided to their consumers, the number of options available to consumers greatly increases. Understanding the contents and general specifications of a particular data package is crucial to determining the correct package needed for any given use case, determining the usage rights available for the package, determining the cost of the package, and determining whether or not a provided package matches that which was ordered. Since these specifications are not always standardized, and since different providers define data package in different ways, it can be an extremely burdensome task to compare package, compare vendors that provide the same or similar package, identify whether a particular package matches its specification, or even keep track of what package are used by an entity.

For example, a consumer receiving a data package, from a number of providers, generally keeps track of the data package they are receiving according to their own identification numbers (e.g., by choice, or even not by choice if any provider-specific identifiers overlap). The providers, however, each keep track of the data products using their own provider-specific identifiers. Thus, when it comes time to manage incoming invoices, it is generally a long and arduous process of waiting for the invoices to arrive from the various providers; matching the provider-specific identifier in each line item of the invoice with a corresponding internal identification number, which itself may be a difficult task involving manually comparing data product specifications; determining whether the received data package is actually the correct one being billed by the vendor; determining whether the invoiced price is the correct price for the received data package; and finally paying the invoice.

Certain aspects and features of the present disclosure relate to systems and methods for generating a uniform package identifier (UPID) that can be used to uniquely describe each data package in a taxonomic fashion, thus permitting multiple entities (e.g., consumers, providers, and others) to communicate and reference unique data packages in a consistent, uniform, and understandable fashion.

Additionally, the specific components included in the UPID permit similar data packages to be easily and quickly compared to one another. For example, a consumer can easily search for a particular data package that meets that consumer's needs by providing a search UPID that includes only a portion of a full UPID. Further, a UPID can be quickly decoded and used to determine whether or not a provided data package is actually the ordered data package. Also, the UPID can permit automation of many tasks in a new way that provides significant flexibility and usefulness to users. For example, since all unique data package would carry a unique UPID, the task of managing invoices as described above becomes extremely simplified, as there is no longer a need to manually compare unique identifiers from multiple providers and the consumer's own identifiers. The UPID schema disclosed herein has been designed as a simple, elegant solution that can convey detailed, defining information, using the fewest possible characters, to relay the greatest amount of detail.

The UPID can be implemented as an alphanumeric code made up of a number of subcomponent codes. As used herein, the term alphanumeric is intended to include i) numbers; ii) letters; or iii) a combination of numbers and letters. In other words, the term alphanumeric is not intended to necessarily require the use of both numbers and letters in a single code (e.g., "224" and "EAL" may both be considered alphanumeric codes). Generally, capitalization of an alphanumeric letter is ignored (e.g., "AB101" is treated the same as "ab101"), although that need not always be the case. In some cases, all alphanumeric letters are automatically converted to capital letters. In some cases, single-character symbols other than alphanumeric characters can be used instead of alphanumeric characters. For example, codes described as alphanumeric codes herein can be replaced by codes that contain or consist of one or more non-alphanumeric characters.

Each UPID can include multiple component codes. Generally, each component code is concatenated in a known order to generate the UPID. Examples of the UPID disclosed herein include at or approximately 85 to 98 alphanumeric characters, although other numbers of characters can be used. In some cases, the UPID include 94 alphanumeric characters.

In some cases, a UPID is made of a set of one or more product attribute codes and a set of one or more service attribute codes. The product attribute codes can describe and define the product associated with the package, and the service attribute codes can describe and define the services associated with the product. In some cases, the product attribute codes include a provider code, a hierarchy code, a product code, a delivery method code, a product delivery frequency code, a solution code, a classification code, and a geography code. In some cases, the service attribute codes include a data source code, a data originator code, a content frequency code, a metadata presence code, and one or more modifying attribute codes. In some cases, to identify improperly provided UPIDs (e.g., mistyped UPIDs or UPIDs corrupted in transit), the UPID includes a checksum, such as a check digit created through the Luhn algorithm.

For illustrative purposes, certain examples are presented herein of UPIDs being generated for and used in the technological field of data brokerage and/or data delivery. When used in such fields, UPIDs can bring various improvements to the technological field(s) as described in further detail herein, such as improvements in the ability to define, search for, track, and invoice data products. However, UPIDs can be applicable to other industries (or verticals) and/or market sectors, and can provide improvements to other technological fields, as well. Therefore, as used herein, any reference to a "data source," "data originator," or any other data-specific terminology can be replaced by the appropriate terminology for that technological field if the data-specific terminology does not apply.

As an example, in the technological field of pharmaceuticals, a UPID could be used to keep track of specific pharmaceutical products in a uniform fashion. The UPID may include codes that encode for various pharmaceutical-specific attributes (e.g., associated pharmaceutical company, chemical components of the product, point of origin, lot/batch information, active ingredients, inactive ingredients, production location and country, distribution location, production date, dosages available, generic or name brand, side effects, drug interactions, contraindications, approved usage, approved transportation method, expiration information, etc.). These codes may be existing codes of the UPID as described herein (e.g., a provider code to encode for the associated pharmaceutical company), alternate version of existing codes (e.g., as an alternate version of the data originator code described herein, a product originator code, which can encode for the company who created the pharmaceutical product), or technology-field-specific codes (e.g., an active ingredients code). In some cases, technological field-specific attributes can be encoded in existing modifying attribute codes through the use of appropriate lookup tables. The use of UPIDs disclosed herein in the technological field of pharmaceuticals can provide numerous improvements, such as the ability to easily track and manage inventory (whether receiving or sending products), handle invoicing, and the like. UPIDs can be especially helpful for entities that receive similar pharmaceuticals from multiple sources, for clinical trials, and for sales profit & loss tracking.

In another example, in the technological field of consumer products, a UPID could be used to keep track of consumer product-specific attributes (e.g., manufacturer, location manufactured, cost, sales restrictions, product type, demographic information, etc.). This type of information can normally be quite challenging to track, especially across many brands, manufacturers, and locations, however use of UPIDs as disclosed herein can be applied to this technological field to make tracking this type of information easy and efficient. The use of UPIDs can also simplify the process of issuing product recalls. For example, if it is determined that a certain part manufactured at a particular location during a particular timeframe is defective, UPIDs could be used to quickly and efficiently identify those products that would fall into the recall, even in situations where the faulty part is used across multiple brands and in various markets. For example, a search UPID (or series of search UPIDs) could be created to match all UPIDs that would fall into the recall, in which case any consumer's product could be quickly assessed to determine if its UPID is a match for the search UPID(s). This type of recall processing can be used in other fields as well, such as pharmaceuticals (e.g., in the case of a contaminated ingredient), food service (e.g., in the case of a viral or bacterial outbreak), and others.

Certain aspects and features of the present disclosure can be especially useful in facilitating cataloging processes. For example, providers of packages can benefit from use of the UPID as disclosed herein, allowing them to create, maintain, and monitor the packages they provide, and the products and services embedded in those packages, at a granular level. Use of the UPID as disclosed herein allows the provider to track all possible combinations of products and/or services for a given package, such as while depicting geography origins, delivery methods, and frequencies.

Certain aspects and features of the present disclosure can be especially useful in sourcing packages. Consumers benefit from sourcing as they can utilize aspects and features of the present disclosure to compare packages at the service level. Consumers can identify comparable services across packages to better understand the parameters of those discrete services, in order to make more informed and cost effective decisions. The use of a UPID as disclosed herein supports seamless comparison of services at the most granular level, including but not limited to: similar data streams from different providers in different product packages; geographical relevance; or granular services for specific discrete attributes.

Certain aspects and features of the present disclosure can be deployed to identify duplicates and overlaps. By leveraging the discrete aspects of products and services within packages offered in the industry, consumers benefit from accurately and readily identifying duplication and overlap of products and services provided by multiple packages. These types of analytical overlap capabilities can be deployed upon contracted packages or packages available in the market prior to contracting. In some cases, the use of a UPID as disclosed herein permits automated identification of duplicates and overlaps in a fast and efficient fashion.

Certain aspects and features of the present disclosure can be especially useful in tracking the history of packages. By using a UPID as disclosed herein, both providers and consumers have the ability to track packages through mergers and acquisitions. The UPID can be assigned to a given package at inception. If an entity merges with or is acquired by another entity, the provider code and product code can remain unchanged, and can be linked to an identifier of the acquiring entity or merged entity via a Provider, Immediate Parent, Ultimate Parent data schema and logic. A hierarchy code can be adjusted to represent the Provider's new position in the corporate structure, and the history of corporate actions, including Acquisitions, Mergers, Divestitures, and Bankruptcies, can be cataloged and tracked. Similarly, if ownership of packages changes hands between providers (e.g., in the case of a sale of a division, or merger and subsequent integration), the product code can remain unchanged and can be linked to the new immediate and ultimate parent company, and the hierarchy codes can be adjusted so that the packages take their new place with the new Vendor in the corporate structure.

Certain aspects and features of the present disclosure can be especially useful in managing data usage. Data in any form is often contractually limited to any contractual and/or usage terms. Use of a UPID as disclosed herein can facilitate linking discrete packages (e.g., discrete data products and services) to their contractual data usage rights. Thus, the managing and tracking of data usage and usage rights can be handled more effectively, with greater efficiency, and with a greater ability of automation.

Certain aspects and features of the present disclosure can be especially useful in selection of providers. Use of a UPID as disclosed herein can facilitate selection of providers by their discrete services. Use of such a UPID allows for specificity in decision making in the selection of data and other providers in a more targeted and dynamic way.

Certain aspects and features of the present disclosure can be especially useful in facilitating audits and usage statements. Use of a UPID as disclosed herein can facilitate the linking of a package to specific audit requirements as well as usage statements of data as contractually required by certain providers. Such a UPID can effectively eliminate confusion as the UPID may be matched to specific and discrete services utilized and allows for auditors and auditing software to expedite the process.

Certain aspects and features of the present disclosure can be especially useful in facilitating various geographic specific capabilities. Consumers benefit from being able to source or identify data, information, and other services by geographic coverage. The use of a UPID as disclosed herein allows for providers to easily and quickly catalog and advertise their specific data sets to the markets, and enables users to quickly and easily identify packages that fit their requirements and needs.

Certain aspects and features of the present disclosure can be especially useful in facilitating requests for information (RFIs) and requests for proposal (RFPs). By utilizing UPIDs as disclosed herein, consumers can identify providers that have similar capabilities and invite relevant providers to join RFI/RFP processes. The UPID can be leveraged to identify similar discrete services offered by a multitude of providers. The UPID can thus facilitate automation of RFI/RFP processes.

Certain aspects and features of the present disclosure can be especially useful in facilitating risk and compliance management. As more regulators (e.g., financial regulators) are requesting that entities (e.g., financial firms) log and track the data which they leverage (e.g., for investing and trading activities), the use of a UPID can facilitate evidencing compliance with regulations. For example, UPIDs can allow a particular data package to be tagged to (e.g., linked with) a financial firm's trade data to identify the provider, data product, and discrete services utilized for trades. Similarly, such tagging of activities (e.g., making financial trades or training a machine learning algorithm) with the UPID of the package upon which that activity is reliant allows discrete research points to be identified that led to the activity (e.g., the decision to make the financial trade) or the activity's result (e.g., the trained machine learning algorithm).

Certain aspects and features of the present disclosure can be especially useful in facilitating management of third party risk. Using UPIDs as disclosed herein, product codes can be maintained through corporate mergers and acquisitions and provider hierarchies can be tracked, thus giving the ability for consumers to track and measure their provider reliance and exposures. The use of centralized alphanumeric codes allows consumers to generate a real time snapshot of third party risk. Further, UPIDs can allow a system to automatically identify and provide filtering or warnings regarding packages that would cause excess third party risk if purchased and/or if used for a particular purpose.

Certain aspects and features of the present disclosure can be especially useful in facilitating regulation compliance. Consumers benefit from the ability to identify the appropriate data and analytics needs to meet current and future regulatory purposes. For example, in many countries, financial regulations call for pre-trade discovery audit trails, Best Execution, and post-trade reporting. UPIDs as disclosed herein can be leveraged for such purposes at a granular level, satisfying these regulatory needs.

Certain aspects and features of the present disclosure can be especially useful in facilitating digitization of certain industries which have been previously difficult to digitize. Applying UPIDs as disclosed herein to different industries creates the ability to transition and digitize information for which manual processes are currently required in other industries. Thus, organizations can streamline workflows (e.g., UPID-dependent automations) such as straight through processing (STP) and have a comprehensive understanding of the constituents of their package and provider portfolios.

Certain aspects and features of the present disclosure can be especially useful in facilitating management of contracts and licenses. Using a UPID as disclosed herein, consumers benefit from having a single Master Security Record of information for contractual terms. This benefit includes, but is not limited to, having a direct correlation and catalog of the products and associated services for contractual terms. Use of UPIDs also benefits both providers and consumers, as it allows discrete services in the contracts to be accurately and reliably identified, and allows data usage rights to be applied with specificity. Services can be transacted with certain licensing rights for specific individuals and specific use cases. The UPID of a particular package or the UPIDs of a handful of packages can be assigned to specific users as per the contractual terms. Digitizing, by the use of UPIDs, the products and services that are applied to contracts eliminates the confusion over different naming conventions that plague many industries. Further, monitoring compliance of contract and license terms can be facilitated and automated through the use of UPIDs.

Certain aspects and features of the present disclosure can be especially useful in determining the return on investment (ROI) of specific data sets. The ability to identify the businesses to which data packages apply via the UPID facilitates the determination of financial return associated with investing in particular datasets.

Certain aspects and features of the present disclosure can be especially useful in facilitating management of invoices. Both providers and consumers benefit from the use of UPIDs as disclosed herein, as the UPID defines the specific package (e.g., product with discrete services) that can be applied to invoices, without the need to manually reconcile provider-specific identifiers and consumer-specific identifiers. Thus, invoicing can be automated and performed in a more efficient and effective manner. The ability for the provider and the consumer to have the same codes applied to invoices will allow for seamless reconciliation and digitization of invoice reconciliation.

Certain aspects and features of the present disclosure can be especially useful in facilitating the formation, execution, and other management of digital contracts. Both providers and consumers benefit from being able to apply a UPID, as disclosed herein, to digital contract formation. The UPID allows both providers and consumers to have a granular view of products and discrete services attached to such contracts. This use will also benefit both sides of the markets with the ability to add or rationalize products and services to existing contracts.

Certain aspects and features of the present disclosure can be integrated into other systems to improve those systems. A UPID as disclosed herein can be integrated into multiple internal and external systems, both proprietary and third party, for tracking and identifying products and services.

Certain aspects and features of the present disclosure can be especially useful for inventory management systems. Many consumers of data leverage inventory management systems to keep track of provider costs, license assignments, and data products. Use of UPIDs as disclosed herein allow for a more granular approach to packages (e.g., to services associated with particular products). It also facilitates the management of multiple providers with an exponential number of products.

Certain aspects and features of the present disclosure can be especially useful for permissioning systems. Many consumers leverage permissioning systems that give internal users permissions to leverage products and services for which they are licensed. As with inventory management systems, use of UPIDs allow for a centralized single taxonomy to manage all products and services managed by an entity.

Certain aspects and features of the present disclosure can be especially useful for invoicing and accounting, and accounts receivable systems. Benefiting both consumers and providers, the integration of UPIDs into both invoicing and accounting systems allows for a single, centralized unique taxonomy that identifies products and services. Using the UPID can minimize existing friction in many markets that require expensive invoice reconciliation services. With the use of UPIDs, invoices can be digitally reconciled in a fast, reliable, and efficient fashion, such as through UPID-based automation.

Certain aspects and features of the present disclosure relate to a new data format for storing certain information about packages in an especially useful and efficient fashion. As disclosed in further detail herein, the use of a UPID as disclosed herein allows users and computing system to interact with packages (e.g., products and/or services associated with products) in new ways, making management of packages much easier, more efficient, and more easily automatable.

Certain aspects and features of the present disclosure are effected through the use of one or more databases that manage component codes that make up each UPID. Such databases can be made publicly available, such as by being accessible for download. In some cases, such databases can be accessed through a purpose-built system or an application programming interface (API), such as to generate or decode a particular UPID or portion of a UPID. Such databases can be stored on one or more computing devices, such as cloud-based servers accessible through the internet or local servers accessible through an intranet. Other devices can be used. Such databases can be updated actively (e.g., a pushed update sent to update a database when a change occurs) or passively (e.g., an update is requested manually or when something requested is not found in the current database). In some cases, the database(s) can include additional information and linkages, allowing certain component codes to be linked to other information. For example, a provider code can be linked to another provider code, indicating that both provider codes are part of the same hierarchy of entities, with the use of hierarchy codes to explicitly identify the position of each provider within the hierarchy.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting an example uniform package identifier (UPID) 100 and its subcomponents, according to certain aspects of the present disclosure. The UPID 100 is a unique identification code that identifies a particular data package. The UPID 100 is an alphanumeric code that is made up of a number of components (e.g., component codes), such as those associated with the product attributes of the data package (e.g., product attribute code(s) 102) and those associated with the service attributes of the data package (e.g., service attribute code(s)104). The UPID 100 can be implemented as an alphanumeric code using the English alphabet and Arabic numerals, although other alphabets and/or numerals can be used.

In use, the UPID 100 can be a string of characters. In some cases, each component code of the UPID 100 can be separated by spaces or other delimiters (e.g., hyphens), although that need not always be the case. For example, the example UPID 100 depicted in FIG. 1 might be represented as "AD597-A12-AA1294-C1-FQ3019-L90301-E31242-122400-AD597-AE903-S01500-1-ILCP02-TPOL00-TM0344-1POL93-TR1289-EY9256-8" or "AD597A12AA1294C1FQ3019L90301E31242122400AD597AE903S015001ILCP02TPOL00TM03441POL93TR1289EY92568." In some cases, the component codes can be implemented such that they can be distinguished (e.g., separated out) without the need for delimiters. For example, in some cases the order and length of each component code can be known, permitting the component codes to be distinguished based on their location in the string.

In another example, some, most, or all of the component codes of the UPID 100 can begin with either an alphabetic character or a numeral character and end with the other of an alphabetic character or a numeral character, thus allowing component codes to be separated at each second switch between numeral characters and alphabetic characters. In such cases, exception codes can be included, such as the code "1" between "1POLS01500" and "ILCP02," which can be a known exception (e.g., the last character of the $n^{th}$ code should be separated as its own code between the $n^{th}$ and $(n+1)^{th}$ codes).

In some cases, a basket code (e.g., basket indicator code) can be used to indicate that the following n number of codes form a single basket. For example, if a six-character geography code is expected after a classification code, a basket code present at that location may indicate that the following two codes are to be considered a single basket, in which case the following twelve characters (or the following two codes separated by delimiters, or the following two codes otherwise identified as separate codes) can be read as two geography codes that make up a single basket.

In some cases, the UPID 100 can include a check digit 106. The check digit 106 can be a digit that is created to ensure the other portions of the UPID 100 are accurately reproduced. Any suitable check digit scheme can be used, such as the Luhn algorithm (e.g., modulus 10 algorithm) for generating a checksum digit. In some cases, multiple check digits can be used instead of check digit 106. In some cases, a checksum hash can be used instead of a check digit 106, which can be part of the UPID 100 or provided separately from the UPID 100.

The UPID 100 can include one or more component codes that are product attribute codes 102. In some cases, the UPID 100 includes one or more subcomponent codes that are service attribute codes 104. The UPID 100 can include both product attribute code(s) 102 and service attribute code(s) 104. Generally, the UPID 100 is a concatenation of the product attribute code(s) 102 and the service attribute code(s) 104, and optionally a check digit 106. Generally, the UPID 100 will include each of the product attribute code(s) 102 and service attribute code(s) 104 in a known order, although that need not always be the case. Generally, the UPID 100 will include product attribute code(s) 102 and service attribute code(s) 104 without necessarily including header information for each code, although that need not always be the case.

In some cases, the product attribute code(s) 102 includes a provider code 108. The provider code 108 can be an alphanumeric code that is used to identify a provider attribute of the data package, such as the particular entity providing the data package. A provider of a data package can be the entity selling or trading the package to a consumer. In some cases, the provider may be the entity from which the data was first created (e.g., when the provider is also a data originator entity) and/or may be the entity from which the data package is received (e.g., when the provider is also a data source entity). In many cases, however, the provider is a separate entity from the original data source and/or data originator.

Each provider can have its own unique provider code 108 that remains associated with the provider throughout the provider's lifecycle. The provider code 108 can be any suitable length. In some cases, the provider code 108 can be a concatenation of an initial string and a provider number. The initial string can be a string of one or more alphanumeric characters that matches the first character(s) of the provider's name. For example, a company entitled "Company A" may have a provider code 108 that begins with the letter "C" whereas a company entitled "2022 Big Business" may have a provider code 108 that begins with the number "2," however this need not always be the case. The provider number can be one or more additional numbers that render the full provider code 108 unique from any existing provider codes. The provider number can contain five digits, although in some cases it can contain fewer or more digits. In some cases, provider numbers are sequentially assigned within each initial string. In some cases, provider codes 108 are simply assigned individually in a sequential or random (e.g., pseudorandom) fashion. Table 1 includes an example list of provider codes 108.

TABLE 1

Example Provider Codes

| Entity Name | Provider Code |
| --- | --- |
| Acme East | AA108 |
| Xylophone Company | AA129 |
| ABC Corp | AB495 |
| Bob's Stores | AB992 |
| Mandolin Inc. | AC948 |
| Ruby Department Stores | AC101 |
| Data Kings | AD851 |

In some cases, the provider code 108 optionally includes a prefix sub-unit that indicates the industry in which the provider operates. For example, all providers in a particular industry may use the same industry-specific prefix. For example, using the companies from Table 1, if "2020 Big Business" and "Company A" are both in a first industry given prefix "AA" and "Company B" is in a second industry given prefix "BA," than the provider codes for "2020 Big Business," "Company A," and "Company B," would be "AA210001," "AAC10001," and "BAC1002," respectively.

In some cases, a provider code 108 can include a concatenated string of letters followed by digits. In an example, a provider code 108 can include two letters followed by three digits, which can provide for 676,000 unique possible code combinations. In some cases, a provider code 108 can include any other number of letters and digits in any other combination. For example, a provider code 108 which includes five letters and/or digits in any combination can provide 60,466,176 unique possible combinations. While certain techniques and standards for establishing provider codes 108 may be used, in some cases a provider code 108 can be automatically and/or randomly assigned.

In some cases, the product attribute code(s) 102 includes a hierarchy code 110. The hierarchy code 110 can be an alphanumeric code that is used to identify a hierarchy attribute associated with the provider of the data product. The hierarchy attribute describes the provider's position within a company hierarchy. The hierarchy code 110 can indicate whether the entity is a parent company or a subsidiary company, and optionally the specific tier and/or position within the hierarchy. For example, a parent company or a provider that is neither a parent company nor subsidiary company may be assigned a known, reserved hierarchy code 110, such as "P11." Thereafter, the first tier of subsidiaries of the parent company may be issued a sequential alphanumeric hierarchy code, such as a hierarchy code according to the sequence "A11," "B11," "C11." Thereafter, the second tier of subsidiaries of the parent company may be issued sequential alphanumeric hierarchy codes that include a portion of the hierarchy code of the first tier subsidiary acting as the parent company of the second tier subsidiary. For example, second tier subsidiaries that are subsidiaries of the company marked "B11" may be issued a hierarchy code according to the sequence "BA1," "BB1," "BC1." Thereafter, the third tier of subsidiaries of the parent company may be issued sequential alphanumeric hierarchy codes that include a portion of the hierarchy code of the second tier subsidiary acting as the parent company of the third tier subsidiary. For example, third tier subsidiaries that are subsidiaries of the company marked "BC1" may be issued a hierarchy code according to the sequence "BCA," "BCB," "BCC." Examples of hierarchy codes 110 are presented in Table 2.

TABLE 2

Example Hierarchy Codes

| Entity name | Parent of Entity | Hierarchy Code |
| --- | --- | --- |
| Company A | — | P11 |
| Company B | Company A | A11 |
| Company C | Company B | AA1 |
| Company D | Company B | AB1 |
| Company E | Company D | ABA |
| Company F | Company D | ABB |
| Company G | Company A | B11 |
| Company H | Company A | C11 |

The examples presented above show a three-character hierarchy code 110, although hierarchy codes 110 of other lengths can be used. The examples presented above show a hierarchy code 110 suitable for three tiers of subsidiaries by using a hierarchy code containing three sub-units. Each sub-unit can be a single alphanumeric character, although that need not always be the case. In the example, presented above, the first sub-unit sequentially advances from "A" for each subsidiary of the parent company, skipping the reserved "P" code used for the parent company. The second sub-unit may sequentially advance from "A" to "AA" for each second tier subsidiary of the parent company. The third sub-unit may sequentially advance from "AA" to "AAA" for each third tier subsidiary of the parent company. When a sub-unit (e.g., the second sub-unit or third sub-unit) is unused (e.g., because the entity is not a second or third tier subsidiary), that sub-unit can be given a known, reserved value, such as "1." In some cases, additional or fewer tiers of subsidiaries can be tracked through the use of additional or fewer sub-units. There is a matrix of hierarchy codes for each first tier subsidiary, second tier subsidiary, and third tier subsidiary. When a three-character hierarchy code is used with a single reserved code (e.g., a "P" code), the total number of possible unique codes is 42,875.

The use of a hierarchy code 110 is especially important as it provides quick and direct information about the various entities the consumer uses. When a consumer receives a data package from a provider, without the information in the hierarchy code 110, the consumer may not know that the provider is a parent or subsidiary of other third parties. In certain industries, third party exposure is highly regulated, and thus the presence of a hierarchy code 110 in the UPID provides information useful to the consumer and upon which a consumer can automate further actions.

In some cases, the product attribute code(s) 102 includes a product code 112. The product code 112 can be an alphanumeric code that is used to identify a product code attribute, which is used to identify the underlying product of the data package. The underlying product can be any unit that is provided by a provider (e.g., sold by a vendor). In some cases, each product code 112 associated with a particular provider (e.g., provider code 108) can be unique. In some cases, each product code 112 is unique, regardless of its particular provider. In such cases, no two providers can use the same product code 112 for their own data products. In the event of a merger, acquisition, or divestiture, the product code 112 for a given data product remains unchanged, and is mapped to the new provider new provider. In some cases, the product code 112 is a combination of one or more alphabet characters followed by one or more numeric characters. In an example, the product code 112 can include a concatenation of two letters followed by four alphanumeric characters, which provides for a total of 6,760,000 possible unique codes. In some cases, the product code 112 can include any other number of letters and digits in any other combination, For example, a provider code 112 which includes six letters and/or digits in any combination can provide 2,176,782,336 unique possible combinations.

In some cases, the product attribute code(s) 102 includes a delivery method code 114. The delivery method code 114 can be an alphanumeric code that is used to identify how the data product is to be provided. The delivery method code 114 can indicate i) a storage form for delivery of the data package (e.g., a data product and/or service of the data package); ii) a route of delivery for delivery of the data product; or iii) a combination of i and ii. Examples of different storage forms for delivery include a type of physical media (e.g., compact disk, hard disk, flash drive) and/or a type of digital media (e.g., a file type used to deliver the data product). Examples of different routes of delivery include via physical mail, via overnight package, via streaming, via download, via email, and the like. Examples of suitable delivery method codes 114 are shown in Table 3.

TABLE 3

Example Delivery Method Codes

| Delivery Method Code | Delivery Method Description |
| --- | --- |
| A0 | Not Indicated |
| A1 | Cloud |
| A2 | Datafeed |
| A3 | Desktop/Terminal |
| A4 | Deployed |
| A5 | Software |
| A6 | FTP |
| A7 | Print Paper/Physical Product |
| A8 | API |
| A9 | Email |
| B0 | CSV |
| B1 | Excel File |
| B2 | Excel Add-in |
| B3 | Data File Services (DFS) |
| B4 | Podcast |
| B5 | Web-Based |
| B6 | SaaS |
| B7 | Blog |
| B8 | Text |
| B9 | TV/Cable media |
| C0 | Webinar |

TABLE 3-continued

Example Delivery Method Codes

| Delivery Method Code | Delivery Method Description |
| --- | --- |
| C1 | Hosted |
| C2 | RSS |
| C3 | PDF |
| C4 | Events and Conferences |
| C5 | Video |
| C6 | Photos |
| C7 | GIFs |
| C8 | Streaming |
| C9 | Hardware |
| D0 | CSV via Datafeed |
| D1 | CSV via FTP |
| D2 | Excel via Datafeed |
| D3 | Excel via FTP |
| D4 | Calendar |
| D5 | White Label |
| D6 | Social Media |
| D7 | Third Party |
| D8 | SFTP |

In some cases, when the delivery code is a two-character alphanumeric code, the total number of possible unique codes is 1,296.

In some cases, the product attribute code(s) 104 include a product delivery frequency code 116. The product delivery frequency code 116 may be drawn from a common table (e.g., a known table) that identifies frequency and limit parameters (e.g., days, percentage limits, numbers, time delays, etc.) and is used, for example, to denote delivery frequency, content update, and tenor. The product delivery frequency code 116 can be an alphanumeric code that is used to identify a delivery frequency attribute, which indicates a frequency of delivery of the data product or a delay in delivery of the data product. Examples of different frequencies of delivery include hourly, twice per day, daily, three times per week, weekly, monthly, once per quarter, yearly, and the like. Any suitable frequency can be used. Delay in delivery can refer to the amount of time elapsed from when the data is initially generated, although in some cases other suitable starting points can be used. For example, quotes from a stock exchange may be available with different delays, such as a live feed (e.g., a delay of approximately a nanosecond or less), a 15-minute delay feed, a 20-minute delay feed, and the like, all at different price points.

In some cases, preset product delivery frequency codes 116 can be used for certain frequency attributes (e.g., weekly, monthly, real time, low latency, and the like). In some cases, certain preset product delivery frequency codes 116 can make use of one or more reserved characters to indicate that the remaining character(s) of the product delivery frequency code 116 can be used to define the unit of time, percentage, or other limit parameters indicated by the reserved character(s). Examples of such fields are marked with an * in Table 4. For example, the character "H" can be used to indicate hours, the character "Y" can be used to indicate years, and the character "O" can be used to indicate nanoseconds. The character X or another delimiting character can be used to indicate the end of a defined measure of time, percentage, or other limit parameter, such as absolute number. The character 0 or another delimiting character can be used to complete the field (e.g., to fill up the expected number of characters for that field if the indicated time does not require all characters). So for example, "H12X00" can indicate 12 hours, "Y005X0" can indicate five years, and "O025X0" can indicate 25 nanoseconds. Examples of delivery frequency codes 116 are shown in Table 4.

TABLE 4

Example product Delivery Frequency Codes

| Delivery Frequency Description | Product Delivery Frequency Code |
|---|---|
| Not Indicated | A10000 |
| Real Time | A10001 |
| Low Latency | A10002 |
| Ultra Low Latency | A10003 |
| Tick Data | A10004 |
| Intraday | A10005 |
| Daily | A10006 |
| Weekly | A10007 |
| Monthly | A10008 |
| Semi Monthly | A10009 |
| Quarterly | A10010 |
| Semiannually | A10011 |
| Annually | A10012 |
| Most Current | A10013 |
| Last | A10014 |
| Delay | A10015 |
| Ad Hoc | A10016 |
| Historical | A10017 |
| Hours* | H12X00 |
| Business Days* | D2X000 |
| T + n (T + 1, T + 2, etc.)* | T200X0 |
| End of day | A10018 |
| End of week | A10019 |
| End of month | A10020 |
| End of quarter | A10021 |
| End of year | A10022 |
| Calendar quarter | A10023 |
| Contract quarter | A10024 |
| Contract end | A10025 |
| Number * | N95000 |
| Percentage * | PCT100 |
| Megasecond * | M1000X |
| Kilosecond * | K1000X |
| Hectosecond * | HS1000 |
| Decasecond * | DS1000 |
| Second * | SEC60X |
| Decisecond | I1000X |
| Centisecond * | C1000X |
| Millisecond * | L1000X |
| Microsecond* | R1000X |
| Nanosecond * | O1000X |
| Picosecond * | P1000X |
| Minute(s) * | MIN60X |
| Hour(s) * | HRS24X |
| Day(s) * | DYS365X |

TABLE 4-continued

Example product Delivery Frequency Codes

| Delivery Frequency Description | Product Delivery Frequency Code |
|---|---|
| Week(s) * | WKS52X |
| Month(s) * | MON12X |
| Quarter(s) * | Q4X000 |
| Year(s) * | Y100X0 |

In some cases, the product delivery frequency code 116 can include a six-character alphanumeric code, in which case the total number of possible unique codes is 2,176,782,336.

In some cases, the product attribute code(s) 102 includes a solution code 118. The solution code 118 can be an alphanumeric code used to identify a solution attribute, which is indicative of a targeted use associated with the data product. In some cases, the solution indicated by a solution code 118 can describe the deliverable or offering at the most granular level possible. Examples of solutions include end of day pricing, analytics, maps, charts, news, etc. The solution is intended to convey the purpose of the particular data product irrespective of the ultimate target of that purpose. For example, a particular data product may be assembled for the purpose of "analytics," and more specifically for the purpose of "generating charts." Such a data product may be assigned a different solution code 118 than one that is assembled for the purpose of "credit risk analysis." Despite the solution code 118 indicating the purpose of these example data products, a further classification code 120 can be used to indicate the target of these purposes.

Each unique solution can be described by a primary solution (e.g., a primary category), and optionally one or more tiers of subcategories. For example, a single primary solution can include multiple different first tier solutions subcategories (e.g., solutions subcategory 1), and each first tier solution subcategory can include multiple different second tier solutions subcategories (e.g., solutions subcategory 2). Any number of subcategory tiers can be used. Each Primary Solution can have a unique solution code and each solution subcategory can have its own unique solution code, also known as a solutions subcategory code. A partial list of examples of solution codes 118 is depicted in Table 5.

TABLE 5

Example Solution Codes

| Solution | Solution Code | Solution Subcategory | Solution Subcategory Code |
|---|---|---|---|
| No Solution Specified | AAA000 | | |
| All Solutions | AAA001 | | |
| Accounting | AAA002 | Billing Solutions | AAA100 |
| Accounting | AAA002 | Cloud Accounting | AAA101 |
| Analysis | AAA003 | Trading Simulation Systems and Analysis | AAA111 |
| Analysis | AAA003 | Trend Analysis | AAA112 |
| Analysis | AAA003 | Yield Calculators | AAA113 |
| Analytics | AAA004 | Analytics | AAA004 |
| Analytics | AAA004 | Cash Flow Modeling | AAA114 |
| Analytics | AAA004 | Cloud Computing | AAA115 |
| Analytics | AAA004 | Complex Event Processing | AAA116 |
| Analytics | AAA004 | Cyber Analytics | AAA117 |
| Analytics | AAA004 | Descriptive Analytics | AAA118 |
| Artificial Intelligence | AAA005 | Algorithms | AAA132 |
| Artificial Intelligence | AAA005 | Machine Learning | AAA135 |
| Artificial Intelligence | AAA005 | Natural Language Processing | AAA136 |
| Compliance Solutions | AAA006 | Compliance Solutions | AAA138 |
| Compliance Solutions | AAA006 | Anti Money-Laundering | AAA139 |
| Compliance Solutions | AAA006 | Audit | AAA140 |
| Compliance Solutions | AAA006 | Best Execution | AAA141 |

TABLE 5-continued

Example Solution Codes

| Solution | Solution Code | Solution Subcategory | Solution Subcategory Code |
|---|---|---|---|
| Compliance Solutions | AAA006 | KYC | AAA145 |
| Compliance Solutions | AAA006 | Regulatory Solutions | AAA145 |
| Data | AAA008 | Alternative Data | AAA158 |
| Data | AAA008 | Corporate Actions | AAA162 |
| Data | AAA008 | Counterparty Data | AAA163 |
| Data | AAA008 | Covenant Data | AAA164 |
| Data | AAA008 | Earnings Data | AAA165 |
| Data | AAA008 | Economic Data | AAA166 |
| Data | AAA008 | Legal Entity Data | AAA167 |
| Data | AAA008 | Limit Order Book | AAA168 |
| Data | AAA008 | P/L Data | AAA170 |
| Data | AAA008 | Reference Data | AAA171 |
| Data Storage | AAA011 | Tape Storage Technology | AAA194 |
| Data Visualization | AAA012 | Charts | AAA195 |
| Data Visualization | AAA012 | Data Dashboards | AAA196 |
| Data Visualization | AAA012 | Diagrams | AAA197 |
| Data Visualization | AAA012 | Graphs | AAA198 |
| Data Visualization | AAA012 | Maps | AAA199 |
| Financial Models | AAA014 | Capital Asset Pricing Model (CAPM) | AAA217 |
| Financial Models | AAA014 | Consolidation Model | AAA218 |
| Financial Models | AAA014 | Discounted Cash Flow (DCF) | AAA219 |
| Financial Models | AAA014 | Economic | AAA220 |
| Financial Models | AAA014 | Econometric | AAA221 |
| Financial Models | AAA014 | Empirical | AAA222 |
| Financial Models | AAA014 | Forecasting Models | AAA229 |
| Financial Models | AAA014 | Greeks | AAA230 |
| Financial Models | AAA014 | Initial Public Offering (IPO) Model | AAA231 |
| Financial Models | AAA014 | Leveraged Buyout (LBO) Model | AAA232 |
| Financial Models | AAA014 | Merger Model (M&A) | AAA233 |
| Financial Models | AAA014 | Mortgage Product and Pricing Models (PPE) | AAA234 |
| Financial Models | AAA014 | Option Pricing Model | AAA235 |
| Financial Models | AAA014 | Programmatic (Algo) Trading Models | AAA236 |
| Investor Relations | AAA015 | Communication | AAA236 |
| Investor Relations | AAA015 | Investment Marketing | AAA244 |
| Investor Relations | AAA015 | Regulatory Information Provision | AAA245 |
| Legal Services | AAA016 | Documentation | AAA246 |
| Legal Services | AAA016 | Litigation | AAA247 |
| Legal Services | AAA016 | Regulatory and Compliance | AAA248 |
| Legal Services | AAA016 | Representation and Advice | AAA249 |
| Management Consulting | AAA017 | Business Process Consulting | AAA250 |
| Management Consulting | AAA017 | Data Consulting | AAA251 |
| Management Consulting | AAA017 | Environmental Consulting | AAA252 |
| Management Consulting | AAA017 | KYC Consulting | AAA266 |
| Management Consulting | AAA017 | Audit Management | AAA267 |
| Management Consulting | AAA017 | Data Privacy | AAA268 |
| Management Consulting | AAA017 | Cyber Threat Protection | AAA269 |
| Management Consulting | AAA017 | GDPR Compliance | AAA270 |
| Management Consulting | AAA017 | Sales Consulting | AAA271 |
| Management Consulting | AAA017 | Science Consulting | AAA272 |
| Management Consulting | AAA017 | Strategic Consulting | AAA274 |
| Management Consulting | AAA017 | White Papers | AAA275 |
| Messaging | AAA019 | Private Messaging | AAA323 |
| Messaging | AAA019 | Proprietary Application Messaging | AAA324 |
| Messaging | AAA019 | Secure Messaging | AAA325 |
| Messaging | AAA019 | Short-Message Service (SMS) | AAA326 |
| Messaging | AAA019 | Two-Factor Authentication Messaging | AAA329 |
| News and Journalism | AAA020 | News and Journalism | AAA020 |
| News and Journalism | AAA020 | Arts News | AAA330 |
| News and Journalism | AAA020 | Business News | AAA330 |
| Pricing | AAA021 | Aggregated Pricing | AAA331 |
| Pricing | AAA021 | Contributed Pricing | AAA332 |
| Pricing | AAA021 | Historical Pricing Data | AAA333 |
| Pricing | AAA021 | Level I Quotes | AAA334 |
| Pricing | AAA021 | Level II Quotes | AAA336 |
| Ratings | AAA022 | Consumer Credit Scores | AAA351 |
| Research | AAA023 | Geographic Research | AAA361 |
| Research | AAA023 | Industry Research | AAA363 |
| Risk Management | AAA024 | Covariant Risk | AAA378 |
| Risk Management | AAA024 | Credit Risk | AAA379 |
| Risk Management | AAA024 | Default Risk | AAA381 |
| Risk Management | AAA024 | Liquidity Risk | AAA393 |
| Risk Management | AAA024 | Market Risk | AAA394 |
| Risk Management | AAA024 | Security and Fraud Risk | AAA400 |
| Risk Management | AAA024 | Sovereign Risk | AAA401 |

TABLE 5-continued

Example Solution Codes

| Solution | Solution Code | Solution Subcategory | Solution Subcategory Code |
|---|---|---|---|
| Software | AAA025 | API Development | AAA402 |
| Software | AAA025 | Application Specific Development Partner | AAA403 |
| Subject Matter Experts | AAA026 | Subject Matter Experts | AAA026 |
| Technology Platforms | AAA027 | Accounting Systems | AAA416 |
| Technology Platforms | AAA027 | Workflow Automation | AAA446 |
| Valuation | AAA030 | Mark-to-Market | AAA466 |
| Valuation | AAA030 | Mark-to-Model | AAA467 |
| Valuation | AAA030 | NAV Pricing | AAA468 |
| Valuation | AAA030 | Tick History | AAA469 |
| Valuation | AAA030 | Trade Data | AAA470 |
| Valuation | AAA030 | Validated Pricing | AAA471 |
| Vendor Management Solutions | AAA031 | Permissioning Management Tools | AAA476 |
| Vendor Management Solutions | AAA031 | Software Usage Rights Management | AAA477 |
| Vendor Management Solutions | AAA031 | Vendor Catalog | AAA478 |
| Vendor Management Solutions | AAA031 | Vendor Dashboard | AAA480 |
| Vendor Management Solutions | AAA031 | Vendor Taxonomy | AAA481 |

In some cases, a given data product may potentially have multiple solutions, and thus multiple solution codes 118. In such cases, the use of different solution codes 118 allows for more granularity in how that data product can be tracked, sold, provided, used, or otherwise managed by providing a unique UPID for each different solution. In some cases, the solution code 118 can include a six-character alphanumeric code, in which case the total number of possible unique codes is 2,176,782,336. In some cases, the different tiers of solution codes (e.g., primary solution code, first tier solution subcategory code, second tier solution subcategory, and the like) can be differentiated by having the respective codes be comprised of different arrangements of letters and digits, or different sequences. For example, a primary solution code can be indicated by a four-digit number (e.g., 1000-9999); a first tier solution subcategory can be indicated by a letter followed by a three-digit number (e.g., A000-A999, B000-B999, etc.); a second tier solution subcategory can be indicated by two letters followed by a two-digit number (e.g., AA00-AA99, BB00-BB99, etc.); and/or a third tier solution subcategory can be indicated by three digits followed by a single letter (e.g., 100A-999A, 100B-999B, etc.). Thus, the number of different tiers that can be presented in this fashion is sixteen. This fashion of presentation allows for one to quickly and easily determine whether or not the solution code 116 is a primary solution code or a different tier solution subcategory code.

In some cases, the product attribute code(s) 102 includes a classification code 120. The classification code 120 can be an alphanumeric code used to identify a classification attribute, which is indicative of one or more targeted use cases associated with the solution indicated by the solution code 118. The classification indicated by the classification code 120 further classifies the solution indicated by the solution code 118. Each solution can have one or more classifications. In a financial example, the particular use case is an asset class or sub-asset class describing the type of asset to which the data product is directed. Other example classifications include movies; music; loans; mortgages; alternative data; environmental, social, and governance (ESG) data; and the like. In some cases, classification can cover all industries and/or market sectors.

Each unique classification can be described by a primary class, and optionally one or more tiers of subclasses. For example, a single class can include multiple different first tier subclasses (e.g., subclass 1), and each first tier subclass can include multiple different second tier subclasses (e.g., subclass 2). Any number of subclass tiers can be used. Each primary class can have a unique classification code and each subclass can have its own unique classification code, also known as a subclass code. In some cases, one or more classification codes for the primary class and any optional subclasses can be combined to generate the classification code, although that need not always be the case.

In an example, two data packages can be similar and used for the same purpose (e.g., generating charts for analytical purposes), but can have different targets for that purpose, such as one for generating charts for analytical purposes for petrochemicals, and one for generating charts for analytical purposes for base metals. In such an example, both data packages can have the same solution code 118, but a first data package may have a first classification code indicating the underlying asset class is a commodity and more specifically a metal and more specifically petrochemicals, and a second data package may have a second classification code indicating the underlying asset class is a commodity and more specifically a base metal. Further granularity is provided in this example by the mapping of "waterfalls" in the modifying attribute tables (modifying attribute codes 132, 134, 136, 138, 140, 142) such that in this example, petrochemicals would be mapped to a modifying attribute "type" table, and would include such items as acetic acid, acetone, acrylic acid, acrylonitrile, etc., and base metals would be mapped to a modifying attribute "type" table, and would include such items as aluminum alloy, brass, cobalt, molybdenum, etc.

The classification code 120 is used to ensure the solution code 118 can be provided independent of the targeted use case (e.g., the asset class, industry segment) for a given data package. For any given combination of a solution and a classification, the data package can be considered as being intended for the use of the solution "for" the classification (e.g., the use of "Chart Generation" for "Mergers and Acquisitions", "News" for the "Pharmaceutical Industry. A partial list of example classification codes 120 is depicted in Table 6.

TABLE 6

Example Classification Codes

| Classification Code | Classification | Classification Subcategory Code | Classification Subcategory |
|---|---|---|---|
| ABA000 | No Classification Specified | | |
| ABA001 | All Classifications | | |
| ABA002 | Foreign Exchange | | |
| ABA003 | Currency | | |
| ABA004 | Cash | ABA102 | Money Markets |
| ABA004 | Cash | ABA103 | Banker's Acceptance |
| ABA004 | Cash | ABA104 | Savings Accounts |
| ABA004 | Cash | ABA105 | Certificates of Deposit |
| ABA004 | Cash | ABA106 | Commercial Paper |
| ABA004 | Cash | ABA107 | Letter of Credit |
| ABA004 | Cash | ABA108 | Interest Rates |
| ABA005 | Commodities | ABA109 | Petrochemicals |
| ABA005 | Commodities | ABA110 | Energy |
| ABA005 | Commodities | ABA111 | Base Metals |
| ABA005 | Commodities | ABA112 | Precious Metals |
| ABA005 | Commodities | ABA113 | Agriculture |
| ABA005 | Commodities | ABA114 | Livestock and Meat |
| ABA005 | Commodities | ABA115 | Forest Products |
| ABA005 | Commodities | ABA116 | Supply Chain |
| ABA006 | Derivatives | ABA117 | Equity Derivatives |
| ABA006 | Derivatives | ABA118 | Fixed Income Derivatives |
| ABA006 | Derivatives | ABA119 | Market Index Derivatives |
| ABA006 | Derivatives | ABA120 | Interest Rate Derivatives |
| ABA007 | Equities | ABA121 | Blue Chip |
| ABA007 | Equities | ABA122 | Emerging Markets |
| ABA007 | Equities | ABA123 | Equity Unit Investment Trusts |
| ABA007 | Equities | ABA124 | Exchange Traded Funds |
| ABA007 | Equities | ABA125 | Growth Stocks |
| ABA007 | Equities | ABA126 | Large Cap |
| ABA007 | Equities | ABA127 | Mid Cap |
| ABA007 | Equities | ABA128 | Mutual Funds |
| ABA007 | Equities | ABA129 | Penny Stocks |
| ABA007 | Equities | ABA130 | Small Cap |
| ABA007 | Equities | ABA131 | Value Stocks |
| ABA008 | Fixed Income | ABA132 | Agencies |
| ABA008 | Fixed Income | ABA133 | High Yield |
| ABA008 | Fixed Income | ABA134 | Investment Grade |
| ABA008 | Fixed Income | ABA135 | Corporates |
| ABA008 | Fixed Income | ABA136 | Municipals |
| ABA008 | Fixed Income | ABA137 | Sovereign |
| ABA008 | Fixed Income | ABA138 | Treasuries |
| ABA008 | Fixed Income | ABA139 | Asset Backed Securities |
| ABA008 | Fixed Income | ABA141 | Loans |
| ABA008 | Fixed Income | ABA142 | Mortgages |
| ABA009 | Real Estate | ABA143 | Residential |
| ABA009 | Real Estate | ABA144 | Commercial (CRE) |
| ABA009 | Real Estate | ABA145 | Industrial |
| ABA009 | Real Estate | ABA146 | Land |
| ABA009 | Vehicles | | |
| ABA010 | Alternative Data | | |
| ABA011 | ESG | ABA176 | Socially Responsible Investing |
| ABA011 | ESG | ABA177 | Circular Economy |
| ABA011 | ESG | ABA178 | Sustainability |
| ABA011 | ESG | ABA179 | CSR |
| ABA011 | ESG | ABA180 | Positive Screening |
| ABA011 | ESG | ABA181 | Negative Screening |
| ABA011 | ESG | ABA182 | Environmental |
| ABA011 | ESG | ABA183 | Social |
| ABA011 | ESG | ABA184 | Governance |
| ABA012 | Islamic Finance | | |
| ABA013 | Indices | | |

In some cases, the classification code 120 can include a six-character alphanumeric code, in which case the total number of possible unique codes is 2,176,782,336. In some cases, the different tiers of classification codes (e.g., classification code, first subclass code, second subclass code, and the like) can be differentiated by having the respective codes be comprised of different arrangements of letters and digits, or different sequences. For example, a classification code can be indicated by a four-digit number (e.g., 1000-9999); a first subclass code can be indicated by a letter followed by a three-digit number (e.g., A000-A999, B000-B999, etc.); and a second subclass code can be indicated by two letters followed by a two-digit number (e.g., AA00-AA99, BB00-BB99, etc.). Thus, the number of classifications and subclasses that can be presented in this fashion is sixteen. This fashion of presentation allows for one to quickly and easily determine whether or not the classification code 118 is a primary classification code or a subclass code. This fashion of presenting classification codes 118 does not always need to be the case.

In some cases, the product attribute code(s) 102 includes a geography code 122. The geography code 122 can be an alphanumeric code that is used to identify a geography attribute, which is an attribute that describes a geographical region associated with the origin of the data package (e.g., the geographical region associated with the origin of the data product). The geographical code 122 can indicate the geographical region in various levels of granularity, such as globally, by economic area (such as Asia Pacific (APAC); Europe, Middle East, and Africa (EMEA); and the like), by region (e.g., North America, South America, Europe, and the like), by country, by state or province, by municipality, by city, by town, and the like. In an example, for a data package that is a feed from a stock exchange, the geography code 122 can indicate the country in which the stock exchange resides. In another example, as described above, the geographical region indicated by the geography code 122 can be used to indicate the regions, countries and the like for which a particular product offers data coverage.

In some cases, unique codes can be provided for each geography (e.g. a geography code) region (e.g., a region code), each country (e.g., a country code) each state or state equivalent municipality (e.g., a state/canton/province code), each municipality (e.g., a municipality code), each city (e.g., a city code), and any other degrees of granularity desired. In some cases, these unique codes can be used as a geography code 122. Examples of geography codes 122 are shown in Table 7, where region codes and country codes are geography codes for particular regions and countries, respectively.

TABLE 7

Example Geography Codes

| Geography | Geography Code | Region | Region Code | Country | Country Code |
|---|---|---|---|---|---|
| Not Specified | 100000 | | | | |
| GLOBAL | 100001 | | | | |
| AMERS | 100002 | Central America | 100011 | Panama | 100134 |
| AMERS | 100002 | North America | 100012 | Bermuda | 100135 |
| AMERS | 100002 | North America | 100012 | Canada | 100136 |
| AMERS | 100002 | North America | 100012 | Mexico | 100138 |
| AMERS | 100002 | North America | 100012 | United States | 100140 |
| AMERS | 100002 | South America | 100013 | Argentina | 100141 |
| AMERS | 100002 | South America | 100013 | Bolivia | 100142 |
| AMERS | 100002 | South America | 100013 | Brazil | 100143 |
| AMERS | 100002 | South America | 100013 | Chile | 100144 |
| AMERS | 100002 | South America | 100013 | Colombia | 100145 |
| AMERS | 100002 | South America | 100013 | Ecuador | 100146 |
| AMERS | 100002 | South America | 100013 | Paraguay | 100150 |
| AMERS | 100002 | South America | 100013 | Peru | 100151 |
| AMERS | 100002 | South America | 100013 | Uruguay | 100153 |
| AMERS | 100002 | South America | 100013 | Venezuela | 100154 |
| APAC | 100003 | Asia | 100015 | China | 100163 |
| APAC | 100003 | Asia | 100015 | Christmas Island | 100164 |
| APAC | 100003 | Asia | 100015 | Hong Kong | 100168 |
| APAC | 100003 | Asia | 100015 | India | 100169 |
| APAC | 100003 | Asia | 100015 | Indonesia | 100170 |
| APAC | 100003 | Asia | 100015 | Japan | 100171 |
| APAC | 100003 | Asia | 100015 | Kazakhstan | 100172 |
| APAC | 100003 | Asia | 100015 | Kyrgyzstan | 100173 |
| APAC | 100003 | Asia | 100015 | Laos | 100174 |
| APAC | 100003 | Asia | 100015 | Pakistan | 100182 |
| APAC | 100003 | Asia | 100015 | Philippines | 100183 |
| APAC | 100003 | Asia | 100015 | Singapore | 100184 |
| APAC | 100003 | Asia | 100015 | South Korea | 100185 |
| APAC | 100003 | Asia | 100015 | Sri Lanka | 100186 |
| APAC | 100003 | Asia | 100015 | Thailand | 100189 |
| APAC | 100003 | Asia | 100015 | Türkiye | 100190 |
| APAC | 100003 | Asia | 100015 | Turkmenistan | 100191 |
| APAC | 100003 | Asia | 100015 | Uzbekistan | 100192 |
| APAC | 100003 | Asia | 100015 | Vietnam | 100193 |
| APAC | 100003 | Oceania | 100016 | American Samoa | 100194 |
| APAC | 100003 | Oceania | 100016 | Australia | 100195 |
| APAC | 100003 | Oceania | 100016 | New Zealand | 100206 |
| EMEA | 100004 | Africa | 100017 | Botswana | 100223 |
| EMEA | 100004 | Africa | 100017 | Burkina Faso | 100224 |
| EMEA | 100004 | Africa | 100017 | Burundi | 100225 |

TABLE 7-continued

Example Geography Codes

| Geography | Geography Code | Region | Region Code | Country | Country Code |
|---|---|---|---|---|---|
| EMEA | 100004 | Africa | 100017 | Cameroon | 100226 |
| EMEA | 100004 | Africa | 100017 | Cape Verde Islands | 100227 |
| EMEA | 100004 | Africa | 100017 | Central African Republic | 100228 |
| EMEA | 100004 | Africa | 100017 | Chad Republic | 100229 |
| EMEA | 100004 | Africa | 100017 | Congo | 100231 |
| EMEA | 100004 | Africa | 100017 | Dem. Republic of the Congo (Zaire) | 100232 |
| EMEA | 100004 | Africa | 100017 | Djibouti | 100233 |
| EMEA | 100004 | Africa | 100017 | Egypt | 100234 |
| EMEA | 100004 | Africa | 100017 | Equatorial Guinea | 100235 |
| EMEA | 100004 | Africa | 100017 | Eritrea | 100236 |
| EMEA | 100004 | Africa | 100017 | Eswatini | 100237 |
| EMEA | 100004 | Africa | 100017 | Ethiopia | 100238 |
| EMEA | 100004 | Africa | 100017 | Morocco | 100255 |
| EMEA | 100004 | Africa | 100017 | Mozambique | 100256 |
| EMEA | 100004 | Africa | 100017 | Namibia | 100257 |
| EMEA | 100004 | Africa | 100017 | Niger Republic | 100258 |
| EMEA | 100004 | Africa | 100017 | Nigeria | 100259 |
| EMEA | 100004 | Africa | 100017 | Somalia Republic | 100267 |
| EMEA | 100004 | Africa | 100017 | South Africa | 100268 |
| EMEA | 100004 | Europe | 100018 | Estonia | 100291 |
| EMEA | 100004 | Europe | 100018 | Finland | 100293 |
| EMEA | 100004 | Europe | 100018 | France | 100294 |
| EMEA | 100004 | Europe | 100018 | Germany | 100295 |
| EMEA | 100004 | Europe | 100018 | Poland | 100316 |
| EMEA | 100004 | Europe | 100018 | Portugal | 100317 |
| EMEA | 100004 | Europe | 100018 | Republic of Ireland | 100318 |
| EMEA | 100004 | Europe | 100018 | Romania | 100319 |
| EMEA | 100004 | Europe | 100018 | Russia | 100320 |
| EMEA | 100004 | Europe | 100018 | San Marino | 100321 |
| EMEA | 100004 | Europe | 100018 | Serbia | 100322 |
| EMEA | 100004 | Europe | 100018 | Slovakia | 100323 |
| EMEA | 100004 | Europe | 100018 | Slovenia | 100324 |
| EMEA | 100004 | Europe | 100018 | Spain | 100325 |
| EMEA | 100004 | Europe | 100018 | Sweden | 100326 |
| EMEA | 100004 | Europe | 100018 | Switzerland | 100327 |
| EMEA | 100004 | Europe | 100018 | Ukraine | 100328 |
| EMEA | 100004 | Europe | 100018 | Vatican City | 100329 |
| EMEA | 100004 | Middle East | 100019 | Bahrain | 100330 |
| EMEA | 100004 | Middle East | 100019 | Iran | 100331 |
| EMEA | 100004 | Middle East | 100019 | Iraq | 100332 |
| EMEA | 100004 | Middle East | 100019 | Israel | 100333 |
| EMEA | 100004 | Middle East | 100019 | Jordan | 100334 |
| EMEA | 100004 | Middle East | 100019 | Kuwait | 100335 |
| EMEA | 100004 | Middle East | 100019 | Lebanon | 100336 |
| EMEA | 100004 | Middle East | 100019 | Oman | 100337 |
| EMEA | 100004 | Middle East | 100019 | Palestine | 100338 |
| EMEA | 100004 | Middle East | 100019 | Qatar | 100339 |
| EMEA | 100004 | Middle East | 100019 | Saudi Arabia | 100340 |
| EMEA | 100004 | Middle East | 100019 | Syria | 100341 |
| EMEA | 100004 | Middle East | 100019 | United Arab Emirates | 100342 |
| EMEA | 100004 | Middle East | 100019 | Yemen | 100343 |
| EMEA | 100004 | United Kingdom | 100020 | England | 100344 |
| EMEA | 100004 | United Kingdom | 100020 | Northern Ireland | 100345 |
| EMEA | 100004 | United Kingdom | 100020 | Scotland | 100346 |
| EMEA | 100004 | United Kingdom | 100020 | Wales | 100347 |

In some cases, the geography code 122 can include a six-character alphanumeric code, in which case the total number of possible unique codes is 2,176,782,336.

The product attribute code(s) 102 can be used to describe information about the nature of the data product associated with the data package. The service attribute code(s) 104, however, can be used to describe additional granularity in the service(s) associated with the data package (e.g., service(s) associated with the data product of the data package), such as information about the sourcing and delivery of the data product. The service attribute code(s) 104 permit a provider to offer a full catalog of data packages (e.g., products and services) with many discrete differences.

In some cases, the service attribute code(s) 104 includes a data source code 124 and/or a data originator code 126. The data source code 124 and data originator code 126 can be alphanumeric codes that are used to identify a data source attribute and a data originator attribute, respectively. The data source attribute indicates the entity that sourced the data, known as the source. The data originator attribute indicates the entity that created or originated the data, known as the originator. The originator can represent the entity from which the data was first collected, and the source can represent the entity from which the data package and/or data product is received and, in some cases, redistributed. The originator and/or source may be the same and/or may be the provider, although that is not always the case. For example, if Company A is a data aggregator organizing the sale of the data package to a consumer, and the data package is being provided by Company B and covers stock data from Stock Exchange C, the provider would be Company A, the data originator would be Stock Exchange C, and the data source would be Company B. In another example, if Company A is distributing its own data directly, Company A would be the provider, the data originator, and the data source. In some cases, the data source code 124 and/or the data originator code 126 can include two letters followed by three numbers, in which case the total number of possible unique codes is 676,000. In some cases, the data source code 124 and/or the data originator code 126 can include a five-character alphanumeric code, in which case the total number of possible unique codes is 60,466,176.

In some cases, the service attribute code(s) 104 includes a content delivery frequency code 128. The content delivery frequency code 128 may be drawn from a common table used for certain frequency attributes (e.g., weekly, monthly, real time, low latency, and the like). This code represents the frequency with which the data is updated, which may or may not be the same frequency with which the product is delivered. In some cases, certain preset frequency codes 128 can make use of one or more reserved characters to indicate that the remaining characters of the frequency code 128 is used to define the unit of time indicated by the reserved character(s). For example, the character "H" can be used to indicate hours, the character "Y" can be used to indicate years, and the character "N" can be used to indicate nanoseconds, in which case "H007" can indicate seven hours, "Y005" can indicate five years, and "N025" can indicates 25 nanoseconds. Examples of content frequency codes 132 are shown in Table 8.

TABLE 8

Example Content update Delivery Frequency Codes

| Delivery Frequency Description | Content Delivery Frequency Code |
| --- | --- |
| Not Indicated | A10000 |
| Real Time | A10001 |
| Low Latency | A10002 |
| Ultra Low Latency | A10003 |
| Tick Data | A10004 |
| Intraday | A10005 |
| Daily | A10006 |
| Weekly | A10007 |
| Monthly | A10008 |
| Semi Monthly | A10009 |
| Quarterly | A10010 |
| Semiannually | A10011 |
| Annually | A10012 |
| Most Current | A10013 |
| Last | A10014 |
| Delay | A10015 |
| Ad Hoc | A10016 |
| Historical | A10017 |
| Hours* | H12X00 |
| Business Days* | D2X000 |
| T + n (T + 1, T + 2, etc.)* | T200X0 |
| End of day | A10018 |
| End of week | A10019 |
| End of month | A10020 |
| End of quarter | A10021 |
| End of year | A10022 |
| Calendar quarter | A10023 |
| Contract quarter | A10024 |
| Contract end | A10025 |
| Number * | N95000 |
| Percentage * | PCT100 |
| Megasecond * | M1000X |
| Kilosecond * | K1000X |

TABLE 8-continued

Example Content update Delivery Frequency Codes

| Delivery Frequency Description | Content Delivery Frequency Code |
| --- | --- |
| Hectosecond * | HS1000 |
| Decasecond * | DS1000 |
| Second * | SEC60X |
| Decisecond * | I1000X |
| Centisecond * | C1000X |
| Millisecond * | L1000X |
| Microsecond* | R1000X |
| Nanosecond * | O1000X |
| Picosecond * | P1000X |
| Minute(s) * | MIN60X |
| Hour(s) * | HRS24X |
| Day(s) * | DYS365X |
| Week(s) * | WKS52X |
| Month(s) * | MON12X |
| Quarter(s) * | Q4X000 |
| Year(s) * | Y100X0 |

In some cases, the content delivery frequency code 128 can include a six-character alphanumeric code, in which case the total number of possible unique codes is 2,176,782, 336.

In some cases, the service attribute code(s) 104 includes a metadata presence code 130. The metadata presence code 130 can be an alphanumeric code that is used to identify a metadata attribute, which is an attribute that describes information about any metadata tagging included in the data package (e.g., metadata tagging included in the data product). In some cases, data packages can include metadata tagging, such as metadata tagging associated with the different data points in the data product (e.g., collection of data) of the data package, and/or the ability to track the progression and movement of data through an organization's workflows.

In some cases, the metadata presence code 130 is used to indicate whether or not metadata is included in the data package (e.g., whether or not the data in the data product is tagged with metadata), and optionally that metadata tagging does not apply to this data package or metadata tagging is unknown. Metadata tagging can include any suitable metadata tagging, such as tagging the data for the purpose of tracking the usage of the data product or data package.

In some cases, the metadata presence code 130 can be a binary or ternary character, although that need not always be the case. When a binary character, the metadata presence code 130 can indicate whether or not the data product includes metadata (e.g., a "0" means metadata is not included and a "1" means metadata is included). When a ternary character, the metadata presence code 130 can indicate whether or not the data product includes metadata and whether metadata tagging is unknown (e.g., a "0" means metadata is not included, a "1" means metadata is included, and a "2" means metadata tagging is unknown or unspecified).

In some cases, other metadata presence codes 130 can be used to provide additional information about the metadata used to tag the data package, such as information about a type of additional metadata included.

In some cases, the service attribute code(s) 104 includes one or more modifying attribute codes 132, 134, 136, 138, 140, 142 (in this case six). Modifying attribute codes 132, 134, 136, 138, 140, 142 represent additional fields of data, which are specific and mapped to combinations of solution codes 118 and classification codes 120. Modifying attribute codes 132, 134, 136, 138, 140, 142 further describe the services associated with the data product at a more granular level information about the service type. For example, in the field of finance, modifying attribute codes 132, 134, 136, 138, 140, 142 can describe the type of instrument associated with the data package, such as a type of bond (e.g., an interest only bond, a bullet bond, a principal only bond, etc.). In another example, in the assignment of specific instrument types for foreign exchange, the first modifying attribute 132 can capture whether the data is referencing, swaps futures, or forwards, which are various instrument types that are asset class specific. The second and third modifying attributes 134 and 136 can identify the base and quote currencies, the fourth modifying attribute 138 can identify tenor, and the fifth modifying attribute 140 can identify fields included for this combination of entries. In some cases, each of the modifying attributes drive the subsequent selections from left to right, such that modifying attribute tables follow a sequence of applicable fields based on the prior solution code 118, classification code 120, and modifying attribute code(s) 132, 134, 136, 138, 140, 142.

In some cases, the modifying attribute codes 132, 134, 136, 138, 140, 142 can include a six-character alphanumeric code, in which case the total number of possible unique codes for each modifying attribute is 2,176,782,336.

The modifying attribute codes 132, 134, 136, 138, 140, 142 may indicate additional granularity including, but not limited to, instrument, currencies, industry sector, tenor, industry, exclusions, language packages, and type. For example, if the solution code 118 indicates "structure" and the classification code indicates "indices," one of the modifying attribute code(s) 132, 134, 136, 138, 140, 142 may indicate type. The type table might contain selections such as sector, corporate, dividend, benchmark, issuance weighted, and the like. The modifying attributes may also indicate industries, specific data fields that are related to each solution, classification, and other parameters.

In some cases, one or more of the modifying attribute codes 132, 134, 136, 138, 140, 142 (of which there can be one, two, or more) may use the same set of codes and common tables (e.g. tenor may draw from a common table used for product frequency delivery code 116 and content delivery frequency code 128). In some cases, the various codes can be differentiated by having the respective codes be comprised of different arrangements of letters and digits. Examples of select modifying attribute tables and codes 132, 134, 136, 138, 140, 142 are shown in Tables 9-11, where the modifying attribute code is a currency code in Table 9, the modifying attribute code is an instrument code in Table 10, and where the modifying attribute code is a language code in Table 11.

TABLE 9

Example modifying attribute codes - currency

| Currency | Currency Code | Currency Symbol | Currency Type |
|---|---|---|---|
| Australian Dollar | MAUD00 | AUD | Traditional Currency - Major |
| Canadian Dollar | MCAD00 | CAD | Traditional Currency - Major |
| Euro | MEUR00 | EUR | Traditional Currency - Major |
| Japanese Yen | MJPY00 | JPY | Traditional Currency - Major |
| New Zealand Dollar | MNZD00 | NZD | Traditional Currency - Major |
| Pound Sterling | MGBP00 | GBP | Traditional Currency - Major |
| Swiss Franc | MCHF00 | CHF | Traditional Currency - Major |
| US Dollar | MUSD00 | USD | Traditional Currency - Major |
| Afghani | TAFN00 | AFN | Traditional Currency |
| Albanian Lek | TALL00 | ALL | Traditional Currency |

TABLE 9-continued

Example modifying attribute codes - currency

| Currency | Currency Code | Currency Symbol | Currency Type |
|---|---|---|---|
| Algerian Dinar | TDZD00 | DZD | Traditional Currency |
| Angola Kwanza | TAOA00 | AOA | Traditional Currency |
| Antarctic Dollar | TEMP00 | EMP | Traditional Currency |
| Argentine Peso | TARS00 | ARS | Traditional Currency |
| Armenian Dram | TAMD00 | AMD | Traditional Currency |
| Aruban Florin | TAWG00 | AWG | Traditional Currency |
| Azerbaijan Manat | TAZN00 | AZN | Traditional Currency |
| Bahamian Dollar | TBSD00 | BSD | Traditional Currency |
| Bahraini Dinar | TBHD00 | BHD | Traditional Currency |
| Bangladesh Taka | TBDT00 | BDT | Traditional Currency |
| Barbados Dollar | TBBD00 | BBD | Traditional Currency |
| Belarusian Ruble | TBYN00 | BYN | Traditional Currency |
| Belize Dollar | TBZD00 | BZD | Traditional Currency |
| Bermudian Dollar | TBMD00 | BMD | Traditional Currency |
| Bhutan Ngultrum | TBTN00 | BTN | Traditional Currency |
| Bolivia Boliviano | TBOB00 | BOB | Traditional Currency |
| Bolivia Mvdol | TBOV00 | BOV | Traditional Currency |
| Bosnian Mark | TBAM00 | BAM | Traditional Currency |
| Botswana Pula | TBWP00 | BWP | Traditional Currency |
| Brazilian Real | TBRL00 | BRL | Traditional Currency |
| Brunei Dollar | TBND00 | BND | Traditional Currency |
| Bulgarian Lev | TBGN00 | BGN | Traditional Currency |
| Burundi Franc | TBIF00 | BIF | Traditional Currency |
| Cabo Verde Escudo | TCVE00 | CVE | Traditional Currency |
| Binance Coin | CBNB00 | BNB | Cryptocurrency |
| Binance USD | CBUSD0 | BUSD | Cryptocurrency |
| Bitcoin | CBTC00 | BTC | Cryptocurrency |
| Bitcoin Cash | CBCH00 | BCH | Cryptocurrency |
| Bitcoin SV | CBSV00 | BSV | Cryptocurrency |
| Cardano | CADA00 | ADA | Cryptocurrency |
| Dogecoin | CDOGE0 | DOGE | Cryptocurrency |
| Enjin Coin | CENJ00 | ENJ | Cryptocurrency |
| EOS | CEOS00 | EOS | Cryptocurrency |
| Ethereum | CETH00 | ETH | Cryptocurrency |
| Ethereum Classic | CETC00 | ETC | Cryptocurrency |

TABLE 10

Example modifying attribute codes - instrument

| Instrument Code | Instrument |
|---|---|
| ACA000 | No Classification |
| ACA001 | Primary - All Classifications |
| ACA002 | American Style Options |
| ACA003 | Basket Options |
| ACA004 | CDO - CBO |
| ACA005 | CDO - CORP BALANCE SHEET |
| ACA006 | CDO - CRE |
| ACA007 | CDO - EM |
| ACA008 | CDO - HIGH YIELD ARB |
| ACA009 | CDO - NPL |
| ACA010 | CDO - PFI |
| ACA011 | CDO - SME |
| ACA012 | CDO - Synthetic CDO |
| ACA013 | CDO - TRUPS |
| ACA014 | CLO |
| ACA015 | CLO Squared |
| ACA016 | CLO Synthetic |
| ACA017 | Credit Default Swaps |
| ACA018 | European Style Options |
| ACA019 | Exchange Traded Derivatives |
| ACA020 | Exchange Traded Options |
| ACA021 | Exotic Options - ASCOT |
| ACA022 | Exotic Options - Barrier |
| ACA023 | Exotic Options - Bermuda |
| ACA024 | Exotic Options - Binary |
| ACA025 | Forwards |
| ACA026 | Futures |
| ACA027 | Fixed Rate Coupon Bonds |

TABLE 11

Example modifying attribute codes - language

| Language | Language Code |
| --- | --- |
| Arabic | AA1111 |
| Dutch (Flemish) | AA1112 |
| English | AA1113 |
| French | AA1114 |
| German | AA1115 |
| Greek | AA1116 |
| Hindi | AA1117 |
| Italian | AA1118 |
| Japanese | AA1119 |
| Korean | AA1120 |
| Mandarin Chinese | AA1121 |
| Norwegian | AA1122 |
| Polish | AA1123 |
| Portuguese | AA1124 |
| Russian | AA1125 |
| Spanish, Castilian | AA1126 |
| Swedish | AA1127 |
| Afrikaans | AA1128 |

In some cases, the sequence and content of the modifying attribute codes 132, 134, 136, 138, 140, 142 in the UPID may be driven by predefined "waterfalls" or combinations of solutions, classifications, and other fields, such that the combinations of certain selections drive the fields and ordering of the modifying attributes that follow. Similarly, fields which are positioned further down the progression of the waterfall can be predeterminately defined by the fields that precede. That is to say that Field B is predetermined by Field A and certain fields that precede. For example, if the selected solution is "pricing" and the selected classification is "foreign exchange," these selections will drive the content of the modifying attribute fields; the modifying attribute fields are predetermined by the earlier fields. For example, in the field of finance, if the solution code 118 is indicative of "structure definition" and classification code 120 is indicative of "indices," then the modifying attribute code 1 132 may be indicative of a type (e.g., a type of index), the modifying attribute code 2 134 may be indicative of an instrument (e.g., a category of instruments), the modifying attribute code 3 136 may be indicative of an industry (e.g., an industry associated with the index), the modifying attribute code 4 138 may be indicative of exclusions (e.g., individual markets not present in the industries selected for modifying attribute code 3 136), the modifying attribute code 5 140 may be indicative of currency (e.g., the currency in which the data is provided), and the modifying attribute code 6 142 may be indicative of fields (e.g., for thematic indices; ticker, constituent types (e.g., public, private, government, nonprofit), sector weights, country weights, industry concentration limits, eligible securities, ineligible securities, rebalancing date, rebalancing frequency, and the like). Certain selections, for example the selection of "thematic" for modifying attribute code 1 132 type, might drive the inclusion of modifying attribute code 3 136 as indicative of industry and modifying attribute code 4 138 as indicative of exclusions. In this same example, if the modifying attribute code 1 132 type indicated something other than "thematic," there may be no modifying attribute code 3 136 or modifying attribute code 4 138, or one or both of these codes may be present, but indicative of things other than industry and exclusions, respectively.

In some cases, certain modifying attribute fields and certain other fields in the UPID will be defined to only allow for one selection.

In certain cases, the modifying attribute codes 132, 134, 136, 138, 140, 142 and other field codes may recognize the incidence of a data basket. A data basket is a grouping of information where the information contained therein is not mutually exclusive. In such cases it would be incorrect to consider or search as individual data points; the basket is what defines the field content. As a financial industry example, in the case of an index which uses constituent data from Singapore among a group of geographies in the calculation, it would be incorrect to separate these geographies as they are not individually part of the product; they are collectively part of the product. Therefore they would be displayed as contained within a basket.

An example of a modifying attribute waterfall with baskets is shown in Tables 12-16. In this example, the solution code 118 selected was indicative of "Structure Definition" and the classification code 120 selected was indicated of "Indices." Table 12 depicts the modifying attributes available for modifying attribute code 1 132 in this example; Table 13 depicts the modifying attributes available for modifying attribute code 2 134 in this example; Table 14 depicts the modifying attributes available for modifying attribute code 3 136 in this example; Table 15 depicts the modifying attributes available for modifying attribute code 4 138 in this example; Table 16 depicts the modifying attributes available for modifying attribute code 5 140 in this example. In each of Tables 12-16, possible selections of modifying attributes are listed, with selected modifying attributes indicated by an "X" in the adjacent column to the left. Each of the modifying attributes listed in Tables 12-16 may be associated with a modifying attribute code (not shown). For example, the indication of "thematic" for modifying attribute code 1 132 may be associated with a particular code (e.g., "ILCP02").

TABLE 12

Example modifying attribute waterfall - modifying attribute code 1
Modifying Attribute 1 (Type)

| | |
| --- | --- |
| | Create Basket |
| | Sector |
| | Corporate |
| | Dividend |
| | Benchmark |
| X | Thematic |
| | Issuance Weighted |
| | ESG |
| | Market-Cap Based |
| | Strategy |
| | Broad-Based |
| | Custom |
| | Factor |

TABLE 13

Example modifying attribute waterfall - modifying attribute code 2
Modifying Attribute 2 (Instrument)

| | |
| --- | --- |
| X | Create Basket |
| | Equity |
| | Equity - Large Cap |
| | Equity - Mid Cap |
| | Equity - Small Cap |
| | Fixed Income Loans |
| | Fixed Income Bonds |
| | Fixed Income Investment Grade |

TABLE 13-continued

Example modifying attribute waterfall - modifying attribute code 2
Modifying Attribute 2 (Instrument)

|   |   |
|---|---|
|   | Sovereign |
|   | Commodities |
|   | Real Estate |

TABLE 14

Example modifying attribute waterfall - modifying attribute code 3
Modifying Attribute 3 (Industry)

|   |   |
|---|---|
| X | Create Basket |
|   | Biotech |
|   | Biotech - Agricultural Biotechnology |
|   | Biotech - Antivirals |
|   | Biotech - Bioinformatics |
|   | Biotech - Biosecurity |
|   | Biotech - Clinical Lab Automation |
| X | Biotech - Environmental |
|   | Biotech - Genomics |
| X | Biotech - Industrial |
|   | Biotech - Medical |
|   | Biotech - Medical Robotics |
|   | Biotech - Molecular Diagnostics |
|   | Biotech - Stem Cell Therapies |
|   | Biotech - Vaccines |
|   | Biotech - Zoonotic Disease Mitigation |
|   | . . . |
|   | Communication |
|   | Communication - Business Infrastructure |
|   | Communication - Content Delivery Network |
|   | Communication - Edge Computing |
| X | Communication - Internet of Things (IOT) |
|   | Communication - Proximity |
|   | Communication - Satellite Connectivity |
|   | Communication - Satellite Imaging |
|   | . . . |
|   | Cybersecurity |
|   | . . . |
|   | Information Technology |
|   | Information Technology - Big Data |
|   | Information Technology - Disruptive Technology |

TABLE 15

Example modifying attribute waterfall - modifying attribute code 4
Modifying Attribute 4 (Exclusions)

|   |   |
|---|---|
| X | Create Basket |
|   | Adult Entertainment |
|   | Alcohol |
|   | Biocide |
|   | Cannabis |
|   | Cinema |
| X | Coal |
|   | Controversial Weapons |
|   | Conventional Financial Services |
|   | Defense/Weapons |
| X | Distribution of drinking water without improvement |
| X | Environmental Controversies |
| X | ESG Controversies |
| X | Fossil Fuels |
|   | Gambling/Casino |
|   | Genetically Modified Organisms (GMO) |
|   | Health Care |
|   | Hotels |
|   | Human Rights Controversies |
|   | Information Technology |
| X | Misaligned with Net Alignment to SDG 12 (Responsible Consumption and Production) |
| X | Misaligned with Net Alignment to SDG 14 (Life Below Water) |
| X | Misaligned with Net Alignment to SDG 15 (Life on Land) |
|   | Music |
| X | Natural Gas |

TABLE 15-continued

Example modifying attribute waterfall - modifying attribute code 4
Modifying Attribute 4 (Exclusions)

|   |   |
|---|---|
| X | Nuclear Energy |
| X | Oil |
|   | Online Dating |
| X | Palm Oil |
|   | Pork Related Products |
|   | Tobacco |
| X | Water treatment chemicals, e.g. |

TABLE 16

Example modifying attribute waterfall - modifying attribute code 5
Modifying Attribute 5 (Currency)

|   |   |
|---|---|
| X | Create Basket |
| X | USD |
| X | EUR |
|   | CAD |
|   | JPY |
|   | GBP |
|   | CHF |
|   | AUS |
|   | SEK |
|   | NZD |
|   | . . . |
|   | AFN |
|   | ALL |
|   | DZD |
|   | AOA |
|   | EMP |
|   | ARS |
|   | AMD |
|   | AWG |
|   | AZN |
|   | BSD |
|   | BHD |
|   | BDT |
|   | BBD |
|   | BYN |
|   | BZD |
|   | BMD |
|   | BTN |
|   | BOB |
|   | BOV |
|   | BAM |
|   | BWP |
|   | BRL |
|   | BND |

As seen in the example with respect to Table 12-16, modifying attribute 1 is indicative of a single selection ("Thematic"), whereas each of modifying attributes 2-5 is indicative of a basket of selections (e.g., for modifying attribute 5, the basket includes both USD and EUR). In some cases, the table used (e.g., potential selections available) for any modifying attribute can be based at least in part on the selection of or combination of selections of one or more of any preceding modifying attributes and/or one or more of any preceding codes of the UPID 100 other than the modifying attribute codes 132, 134, 136, 138, 140, 142 (e.g., a solution code 118 and a classification code 120). As used with respect to a modifying attribute being based at least in part on a "preceding" code, the term "preceding" is intended to include any code which is interpreted prior to the modifying attribute, regardless of physical position within the UPID 100 (e.g., a UPID set up to be interpreted from right-to-left may include a given modifying attribute code that is based at least in part on a "preceding" modifying attribute code that is positioned later in the UPID than the given modifying attribute code).

In some cases, modifying attribute codes 132, 134, 136, 138, 140, 142 (of which there can be one, two, more than two, or in some cases six or more) can include a six-character alphanumeric code, in which case the total number of possible unique codes is 2,176,782,336. In some cases, the different tiers of modifying attribute codes (e.g., modifying attribute 1, modifying attribute 2, modifying attribute 3, modifying attribute 4, and the like) can be differentiated by having the respective codes be comprised of different arrangements of letters and digits, although that need not always be the case.

Each of the different codes described with reference to UPID 100 can be initially generated manually or automatically. Automatic generation can include assigning codes sequentially or using a random or pseudorandom technique to identify a next unique code to use.

While depicted with certain component codes, in some cases a UPID 100 can include fewer or additional component codes, as well as component codes in different orders.

As described herein, a UPID 100 can be a ninety-four character code. The length of this code can be especially useful as it provides sufficient unique combinations for each component code, while maintaining a sufficiently small overall UPID 100 that can be easily shared and viewed.

Each of the various codes described above (e.g., various product attribute code(s) 102 and service attribute code(s) 104) are presented as having a certain number of characters. Depending on the industry use case, the number of characters for any particular code described herein may be increased or decreased to provide more or less capacity and/or granularity of expression. For example, for an industry with very few companies operating in the industry, the provider code 108 may have fewer than five characters. Likewise, for an industry (e.g., consumer goods) where there may be large numbers of $1^{st}$, $2^{nd}$, and $3^{rd}$, subsidiaries, the hierarchy code 110 may contain five or more characters (e.g., with a $1^{st}$ subsidiary tier being represented by more characters than the examples presented above with reference to hierarchy code 110).

Figure 2:
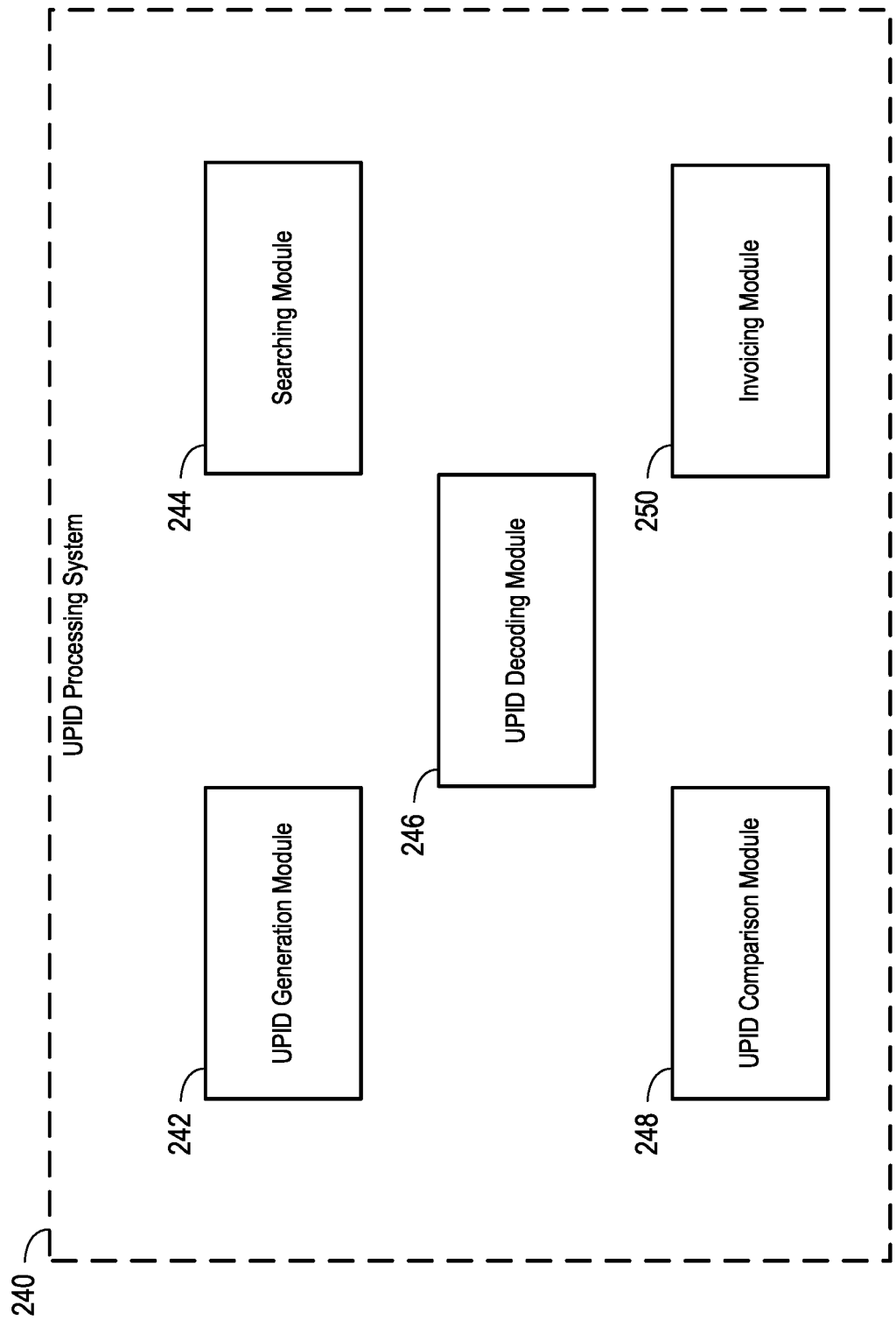
FIG. 2 is a schematic diagram of a UPID processing system, according to certain aspects of the present disclosure.

FIG. 2 is a schematic diagram of a UPID processing system 240, according to certain aspects of the present disclosure. The UPID processing system 240 can include a UPID generation module 242, a searching module 244, a UPID decoding module 246, a UPID comparison module 248, and an invoicing module 250. The UPID processing system 240 can be embodied on one or more computing devices, such as a user device (e.g., a smartphone, a tablet computer, a personal computer, a smartwatch, etc.), a server (e.g., a network-accessible server such as an intranet-accessible server or an internet-accessible server), or the like. In some cases, any combination of the modules 242, 244, 246, 248, 250 can be implemented on any combination of computing devices.

The UPID generation module 242 can generate a UPID for a data package based on one or more product attributes and/or one or more service attributes, such as described with reference to process 300 of FIG. 3. In some cases, the UPID generation module 242 can obtain the product attributes and/or service attributes from specification information associated with a data package. In some cases, the UPID generation module 242 can store the UPID in association with the data package itself, such as described with reference to process 400 of FIG. 4. In some cases, if additions are made to any databases associated with component codes (e.g., if a new provider is introduced, thus requiring introduction of a new provider code), the UPID generation module 242 can access and update the database(s).

The searching module 244 can identify a selected data package based at least in part on a search UPID, such as described with reference to process 600 of FIG. 6. The search UPID can be provided or can be generated from provided search attributes (e.g., desired product attributes and/or service attributes).

In certain cases, the searching module 244 may recognize the incidence of a data basket, which is a grouping of information where the information contained therein is not mutually exclusive and be incorrect to separate in a search. In most cases, datapoints within a basket are not mutually exclusive when conducting a search, excepting in a UPID search that specifies "includes [specific parameters]" as opposed to a direct search on this parameter. For example, a user may want information on Singapore indices. An index which uses data from Singapore among a group of other geographic locations in its calculation(s) would not come up in a search, as the "Singapore" indication it is contained within a basket. In such a case, searching for "Singapore Indices" would not yield in the search results the index that merely includes Singapore in the grouping (e.g., basket) of geographic locations used for the index's calculation(s). However, if one were to search "Indices that include Singapore," this index would appear in the search results.

UPID decoding module 246 can generate one or more product attributes, one or more service attributes, and/or specification information for a data package using a UPID. The UPID decoding module 246 can receive a UPID string and output information about the data package that is represented by the component codes of the UPID string. The UPID decoding module 246 can access one or more databases associated with the component codes of the UPID string.

The UPID comparison module 248 can be used to match and/or compare multiple data packages, such as to identify the differences between the data packages, using UPIDs, such as described with reference to process 500 of FIG. 5.

The invoicing module 250 can be used to identify pricing associated with one or more UPIDs, such as to generate and/or confirm invoices, such as described with reference to process 700 of FIG. 7.

The UPID processing system 240 can include one or more input/output devices, such as keyboards, mice, displays, touchscreen displays, printers, and the like. Any input/output device can be used as appropriate to input and/or output information associated with the UPID processing system 240, such as UPIDs and/or specification information. In some cases, UPID processing system 240 includes a network interface to receive and/or transmit information associated with the UPID processing system 240, such as UPIDs, specification information, data products, and/or data packages.

UPID processing system 240 is depicted with certain modules, although that need not always be the case. In some cases, the UPID processing system 240 can include fewer, additional, or different modules. For example, in some cases the UPID processing system 240 can additionally include a code generation module, which can automatically assist in the generation of new component codes for any of the other modules (e.g., for the UPID Generation Module 242), such as by automatically detecting and avoiding alphanumeric sequences that are prohibited, such as described with reference to process 800 of FIG. 8.

Figure 3:
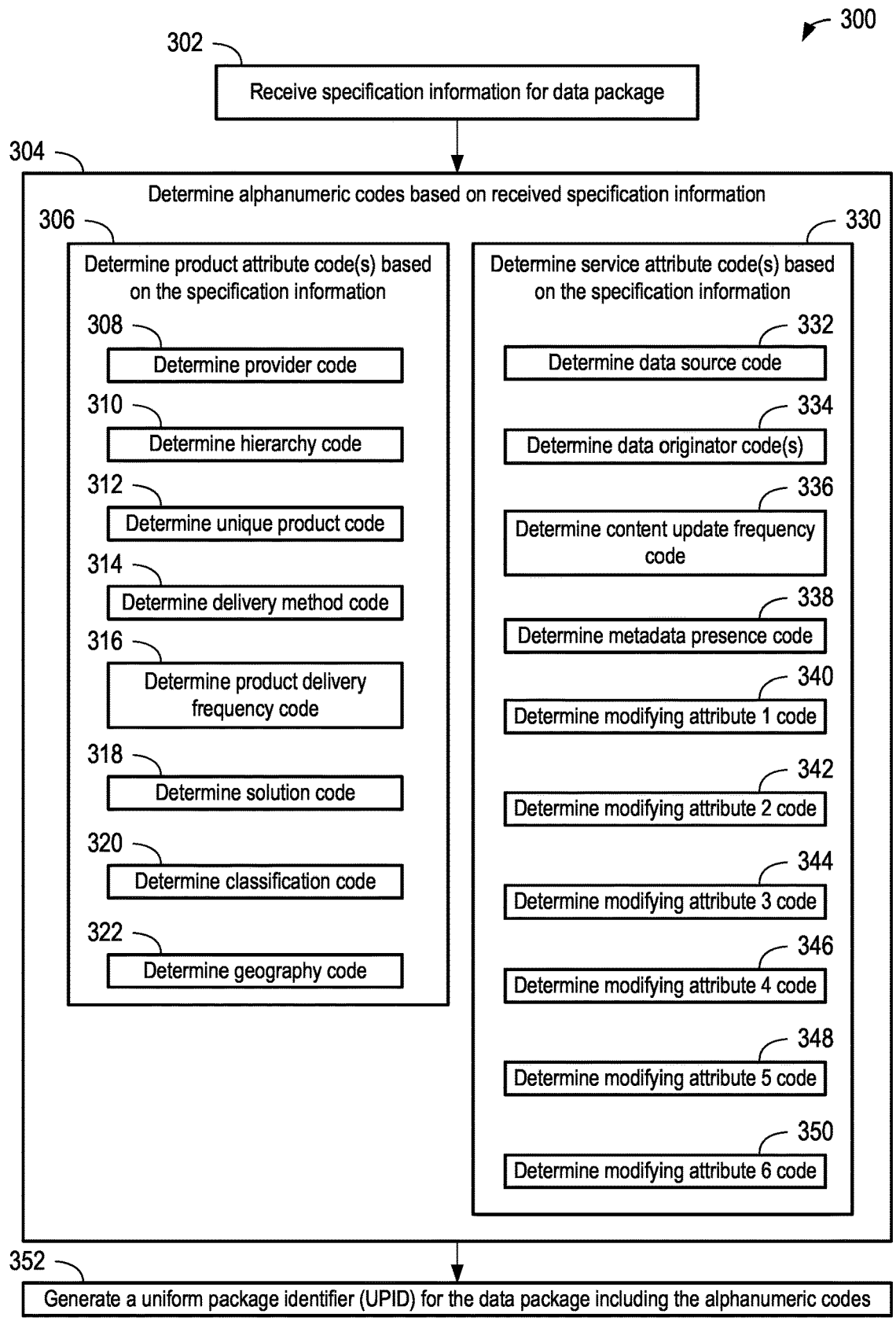
FIG. 3 is a flowchart diagram depicting a process for generating a UPID, according to certain aspects of the present disclosure.

FIG. 3 is a flowchart diagram depicting a process 300 for generating a UPID, according to certain aspects of the present disclosure. Process 300 can be performed on any suitable device, such as those disclosed elsewhere herein.

At block 302, specification information for a data package can be received. Receiving specification information can include receiving information about the data package in any suitable form. In some cases, the received specification information is normalized or otherwise converted from an original format. In some cases, received specification information is received as open text or free text. In some cases, received specification information is received as responses to provided prompts. The specification information is informative of one or more of the product attributes and/or service attributes disclosed herein.

In some cases, receiving specification information at block 302 can include receiving a data package and automatically analyzing the data package to extract specification information from the data package.

At block 304, alphanumeric codes are determined based on the received specification information. The alphanumeric codes determined at block 304 are component codes that are ultimately used to generate the UPID. Generating alphanumeric codes at block 304 can include automatically generating the alphanumeric codes from the specification information without further input from a user. Generating alphanumeric codes at block 304 can include generating the various alphanumeric codes described with reference to UPID 100 of FIG. 1.

In some cases, determining alphanumeric codes at block 304 includes determining, at block 306, one or more product attribute codes based on the specification information from block 302. Determining a product attribute code at block 306 can include determining the product attribute and determining a code for the product attribute. In some cases, a product attribute itself is present in the specification information, in which case determining a product attribute can include extracting the product attribute from the specification information (e.g., if the specification explicitly lists "API" as the delivery method, when "API" is a delivery method attribute). In some cases, a product attribute code itself is present in the specification information, in which case determining a product attribute code can include extracting the product attribute code from the specification information (e.g., if the specification explicitly says the delivery method code is "I1").

When a product attribute or its code is not explicitly present in the specification, the specification can be interpreted to identify different product attributes. In some cases, one or more likely product attributes can be determined, in which case the process 300 can include requesting user feedback to select a desired product attribute or automatically selecting a product attribute to use (e.g., a highest ranked product attribute when likely product attributes are ranked by likelihood of being accurate).

When a product attribute is determined, determining the product attribute code can include accessing a database containing product attribute codes for that particular type of product attribute (e.g., a database containing delivery method codes when the product attribute is a type of delivery method), and identifying the product attribute code that matches the determined product attribute. In some cases, however, if no product attribute code is identified in the database, a new product attribute code can be created. Creation of a new product attribute code can include creating the code according to the schema of that type of product attribute (e.g., if delivery method codes are created sequentially by progressing from "A1" to "Z1" and then from "A2" to "Z2", and the last delivery method code is "D2," a new type of delivery method could be added with the delivery method code "E2"), and the new product attribute code can be stored in the database along with the determined product attribute.

In some cases, determining a product attribute at block 306 can include determining a provider code from the specification information at block 308. When the provider code or provider attribute (e.g., a provider name, such as a corporate name) is not included in the specification information, block 308 can include identifying information about the provider of the data product from the specification information, and using that identified information to infer a particular provider attribute (e.g., a particular provider name) and/or set of likely provider attributes (e.g., set of likely provider names).

In some cases, determining a product attribute at block 306 can include determining a hierarchy code from the specification information at block 310. When the hierarchy code or hierarchy attribute (e.g., company with no parents or subsidiaries) is not included in the specification information, block 310 can include receiving provider information from block 308 (e.g., a provider code or provider attribute, such as a provider name) and searching a database of provider information to identify the proper hierarchical position of the given provider in a hierarchy. The hierarchical position can be used as the hierarchy attribute or to generate the hierarchy attribute. In some cases, if no hierarchical position is found, a hierarchy code indicative of uncertain hierarchy can be used, or a top tier code (e.g., company with no parents or subsidiaries or an ultimate parent company) can be used.

In some cases, determining a product attribute at block 306 can include determining a unique product code from the specification information at block 312. When the unique product code or unique product attribute (which can be a unique product code or other attribute usable to determine the unique product code) is not included in the specification information, block 312 can include identifying information about the data product associated with the data package from the specification information, and using that identified information about the data product to infer a unique product attribute and/or a set of likely unique product attributes.

In some cases, determining a product attribute at block 306 can include determining a delivery method code from the specification information at block 314. When the delivery method code or delivery method attribute is not included in the specification information, block 314 can include identifying information about how the data product is delivered (e.g., via floppy disk) from the specification information, and using that identified information to infer a particular delivery method attribute and/or set of likely delivery method attributes.

In some cases, determining a product attribute at block 306 can include determining a product delivery frequency code from the specification information at block 316. When the delivery frequency attribute code or delivery frequency attribute is not included in the specification information, block 316 can include identifying information about the frequency of delivery of the data product or a delay in delivery of the data product from the specification information, and using that identified information to infer a delivery frequency attribute and/or a set of likely delivery frequency attributes.

In some cases, determining a product attribute at block 306 can include determining a solution code from the specification information at block 318. When the solution code or solution attribute is not included in the specification information, block 318 can include identifying information about how the data product is intended to be used (e.g., chart generation) from the specification information, and using that identified information to infer a particular solution attribute and/or set of likely solution attributes.

In some cases, determining a product attribute at block 306 can include determining a classification code from the specification information at block 320. When the classification code or classification attribute is not included in the specification information, block 320 can include receiving solution information from block 318 (e.g., a solution attribute or a solution code) and identifying information from the specification information about the intended target which that solution is for as it pertains to the data product (e.g., municipal bonds, where the solution of "chart generation" is for "municipal bonds" when the data product is intended to generate charts for municipal bonds), and using the solution information and identifying information to infer a particular classification attribute and/or set of likely classification attributes.

In some cases, determining a product attribute at block 306 can include determining a geography attribute code from the specification information at block 322. When the geography attribute code or geography attribute is not included in the specification information, block 332 can include identifying information about the geographical region associated with the data package from the specification information, and using that identified information to infer a geography attribute and/or a set of likely geography attributes.

In some cases, determining alphanumeric codes at block 304 includes determining, at block 330, one or more service attribute codes based on the specification information from block 302. Determining a service attribute code at block 330 can include determining the service attribute and determining a code for the service attribute. In some cases, a service attribute itself is present in the specification information, in which case determining a service attribute can include extracting the service attribute from the specification information (e.g., if the specification explicitly lists a particular company as the data source, that company can be the data source attribute). In some cases, a service attribute code itself is present in the specification information, in which case determining a service attribute code can include extracting the service attribute code from the specification information (e.g., if the specification explicitly says the data source is "AD597"

When a service attribute is determined, determining the service attribute code can include accessing a database containing service attribute codes for that particular type of service attribute (e.g., a database containing index types when the modifying attribute 1 is index type), and identifying the service attribute code that matches the determined service attribute. In some cases, however, if no service attribute code is identified in the database, a new service attribute code can be created. Creation of a new service attribute code can include creating the code according to the schema of that type of service attribute (e.g., if index type codes are created sequentially progressing from "1000," and the last index type code is "ILCP02," a new type of delivery frequency could be added with the delivery frequency code "ILCP03"), and the new service attribute code can be stored in the database along with the determined service attribute.

In some cases, determining a service attribute at block 330 can include determining a data source code from the specification information at block 332. When the data source code or data source attribute is not included in the specification information, block 332 can include identifying information about the entity from which the data product or data package was received from the specification information, and using that identified information to infer a source attribute and/or a set of likely source attributes.

In some cases, determining a service attribute at block 330 can include determining a data originator code from the specification information at block 334. When the data originator code or data originator attribute is not included in the specification information, block 334 can include identifying information about the entity from which the data was first collected from the specification information, and using that identified information to infer an originator attribute and/or a set of likely originator attributes.

In some cases, determining a service attribute at block 330 can include determining a content update frequency code from the specification information at block 336. When the content update frequency code or content update frequency attribute is not included in the specification information, block 336 can include identifying information about the frequency of update of the data product or a delay in update of the data product from the specification information, and using that identified information to infer a content update frequency attribute and/or a set of likely content update frequency attributes.

In some cases, determining a service attribute at block 330 can include determining a metadata presence code from the specification information at block 338. When the metadata presence code or metadata presence attribute is not included in the specification information, block 338 can include identifying information about any metadata tagging of the data product or data package from the specification information, and using that identified information to infer a metadata presence attribute and/or a set of likely metadata presence attributes. In some cases, the data product and/or data package can be scanned and analyzed to determine whether or not metadata tagging is present.

In some cases, determining a service attribute at block 330 can include determining one or more modifying attribute codes from the specification information at blocks 340, 342, 344, 346, 348, 350. Determining one or more modifying attribute codes at blocks 340, 342, 344, 346, 348, 350 can include identifying additional information about the service provided by the data package from the specification information, and using that identified information to select or infer a modifying attribute and/or a set of likely modifying attributes. In some cases, a first modifying attribute from block 340 can be used, along with the identified information, to define or otherwise affect subsequent modifying attributes and/or a set of likely modifying attributes.

In some cases, determining the one or more modifying attribute codes includes determining at least a first modifying attribute code at block 340 and a second modifying attribute code at block 342. For example, in the case of foreign exchange, the first modifying attribute code can be indicative of a type of foreign exchange instrument (e.g., forward) and the second and third modifying attribute codes can be indicative of the base and quote currencies, respectively (e.g. EUR and USD). Based on this combination of previous attributes, tenor is the next modifying attribute for further defining the data (e.g., tenor of 3 months) and can be reflected in the fourth modifying attribute 346. While six modifying attribute codes are shown as being determined in block 330 (e.g., at blocks 340, 342, 344, 346, 348, 350), any number of modifying attribute codes can be determined as suitable for the given use case.

In some cases, determining a modifying attribute code at any of blocks 340, 342, 344, 346, 348, 350 can include first identifying the subject or category of the modifying attribute. In the above example of foreign exchange, the subject or category of the first modifying attribute is "type of foreign exchange instrument." Determining the subject or category of the modifying attribute can be based at least in part on one or more other codes (e.g., the solution code from block 318 and/or the classification code from block 320). In this example, the solution code and classification code may be codes that are associated with foreign exchanges.

At block 352, the alphanumeric codes from block 304 are used to generate a UPID. Generating the UPID at block 352 can include concatenating the alphanumeric codes. Concatenating the alphanumeric codes can include concatenating the alphanumeric codes in a known order. In some cases, generating the UPID at block 352 further includes generating a checksum, such as a check digit. In some cases, generating the UPID at block 352 includes concatenating the checksum or check digit along with the alphanumeric codes from block 304, such as appending the checksum or check digit to the end of the concatenated alphanumeric codes.

Process 300 is depicted with certain blocks in certain orders, although that need not always be the case. In some cases, process 300 can include fewer, additional, or different blocks, and in different orders. In some cases, generating a new product attribute code or a new service attribute code in blocks 306, 330, respectively, can include avoiding prohibited character sequences, as described with reference to process 800 of FIG. 8.

Figure 4:
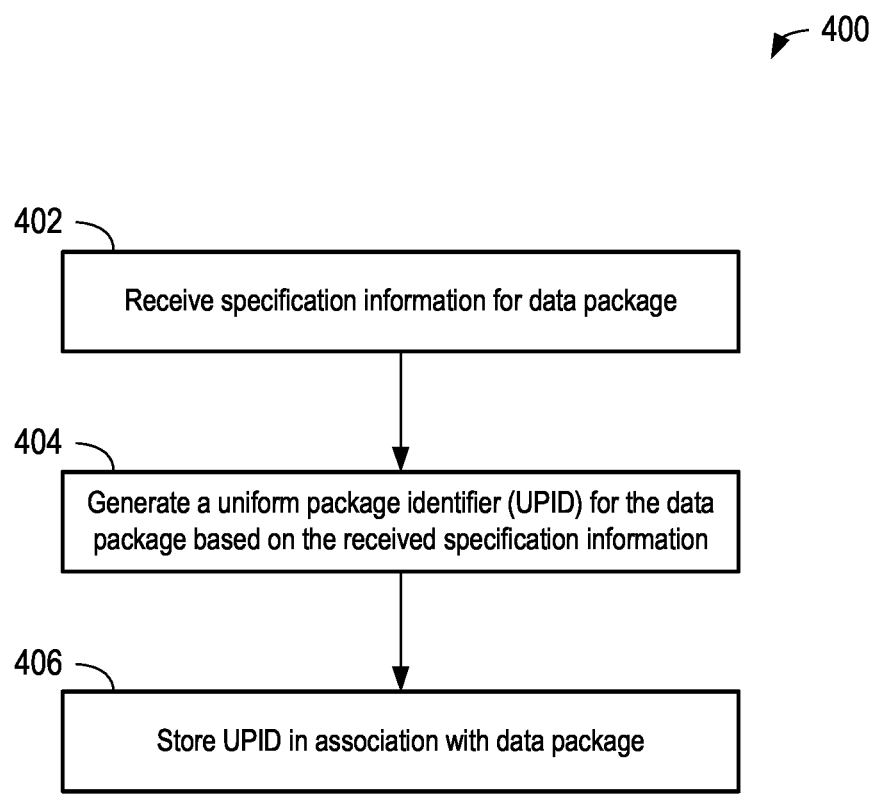
FIG. 4 is a flowchart diagram depicting a process for generating and storing a UPID in association with a data product, according to certain aspects of the present disclosure.

FIG. 4 is a flowchart diagram depicting a process 400 for generating and storing a UPID in association with a data product, according to certain aspects of the present disclosure. Process 400 can be performed on any suitable device, such as those disclosed elsewhere herein.

At block 402, specification information is received for a data package. Receiving specification information at block 402 can be similar to receiving specification information at block 302 of FIG. 3.

At block 404, a UPID for the data package is generated. Generating the UPID at block 404 can be similar to generating the UPID at block 352 of FIG. 3, and in some cases includes determining alphanumeric codes, such as described with reference to block 304 of FIG. 3.

At block 406, the UPID can be stored in association with the data package. Storing the UPID in association with the data package can include labeling a physical object associated with the data package (e.g., a piece of physical media containing the data product or data package) with the UPID. In some cases, storing the UPID in association with the data package can include storing the data package or code to implement the data package in a fashion that is searchable using the UPID. The UPID can be stored in association with the data package in any other suitable ways.

Process 400 is depicted with certain blocks in certain orders, although that need not always be the case. In some cases, process 400 can include fewer, additional, or different blocks, and in different orders.

Figure 5:
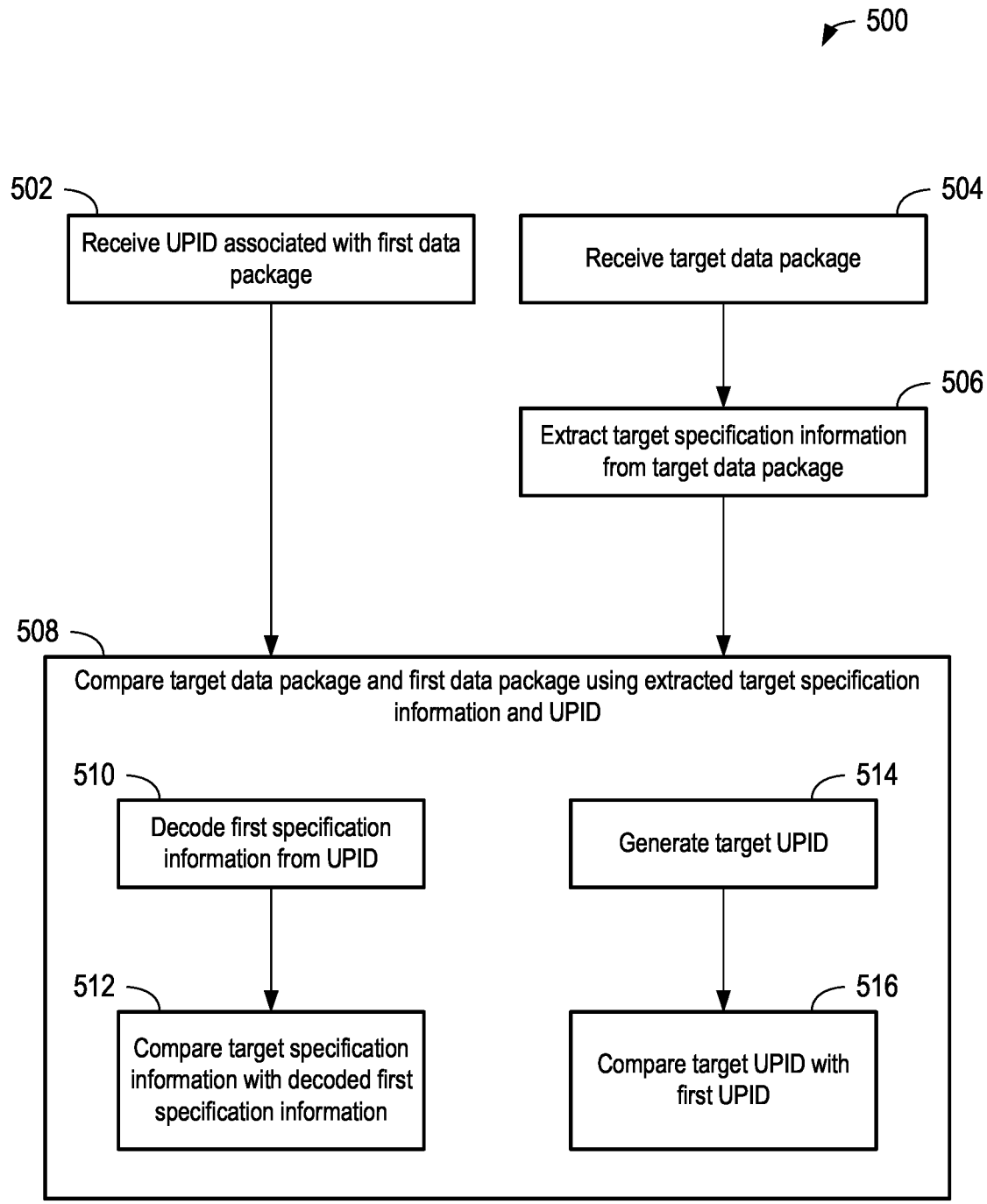
FIG. 5 is a flowchart diagram depicting a process for comparing data products using UPID(s), according to certain aspects of the present disclosure.

FIG. 5 is a flowchart diagram depicting a process 500 for comparing data products using UPID(s), according to certain aspects of the present disclosure. Process 500 can be performed on any suitable device, such as those disclosed elsewhere herein.

At block 502, a UPID associated with a first data package is received. In some cases, this first UPID can be received as a text string. In some cases, the first UPID can be determined from a data package and/or a data package specification, such as described with reference to process 300 of FIG. 3.

At block 504, a target data package is received. The target data package can be a data package that is to be compared with the first UPID from block 502. For example, the target data package can be a data package that is received as part of a provider's obligation under a contract that lays out that the provider needs to provide a particular data package identified by a particular UPID, which can be the first UPID. Thus, process 500 can be used to compare that the target data package received at block 504 has the same UPID as the first UPID from block 502, and is thus compliant under the contract. Other types of comparisons can be used.

At block 506, target specification information can be extracted from the target data package of block 504. Extracting the target specification information can include extracting existing specification information from the data package or a file associated with the data package. In some cases, however, extracting the target specification information can include analyzing the data package to generate specification information associated with the data package. For example, analyzing the data package can result in a determination that the data product is provided daily, in which case the specification information can include an indication that the delivery frequency is daily.

At block 508, the target data package and the first data package can be compared using the UPID from block 502 and the extracted specification information from block 506. Comparison can be based on specification information (e.g., raw specification information, raw product and/or service attribute, or the like) or on UPIDs.

In some cases, comparing at block 508 includes decoding first specification information from the first UPID at block 510 and then comparing that decoded first specification information with the target specification information at block 512.

In some cases, comparing at block 508 includes generating a target UPID from the target specification information at block 514 and then comparing the target UPID with the first UPID at block 516.

Process 500 can be used in many fashions. In some cases, the output of block 508 can be an indication that the first UPID (e.g., and/or its first data package) and the target data package are equivalent (e.g., having the same UPID) or not equivalent (e.g., having different UPIDs).

In some cases, the output of block 508 can indicate any differences between the first UPID and/or the first data package of block 502 and the target data package. For example, if the first data package and second data package are identical except the first data package provides real time data and the second data package provides 15-minute delayed data, the output of block 508 can be an indication that the delivery frequency attribute differs between the two data packages.

In some cases, the output of block 508, indicating any differences in product attributes or service attributes between the first UPID and the target data package, can be used to identify what products/services the target data package is missing to meet the requirements of the first UPID. In such cases, those differences can be used as a search UPID (e.g., as described with reference to process 600 of FIG. 6) to identify a data package that can supplement the target data package to obtain the products/services expected from the first UPID. For example, if a first UPID and target UPID are identical except the geography code, with the first UPID indicating a geography attribute of all of the EMEA, and the target data package having a geography attribute of Europe, the output of block 508 can be used to identify one or more additional data packages that are otherwise identical to the first UPID, but cover the remaining geographic regions in the EMEA that are not Europe (e.g., the Middle East and Africa).

Process 500 is depicted with certain blocks in certain orders, although that need not always be the case. In some cases, process 500 can include fewer, additional, or different blocks, and in different orders.

Figure 6:
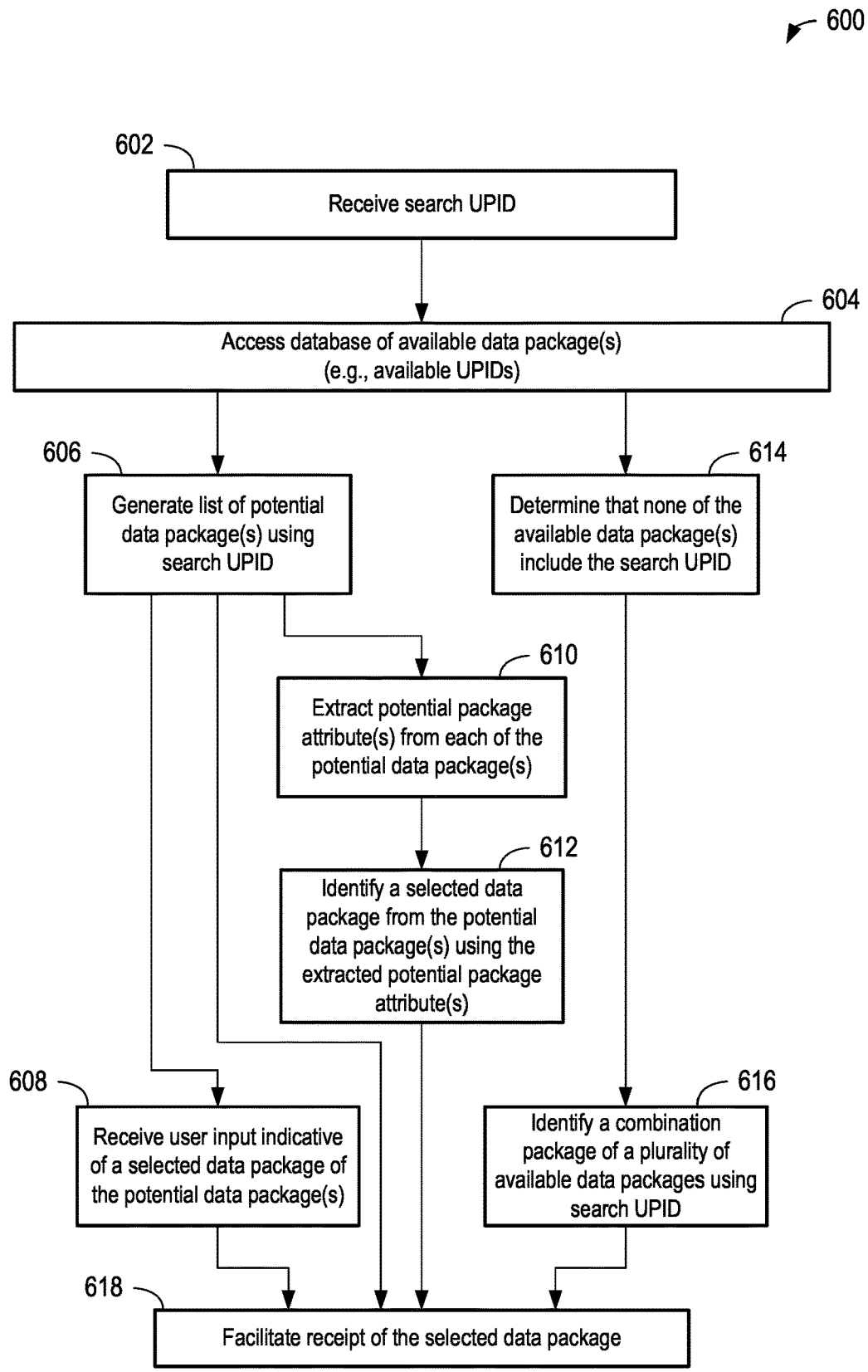
FIG. 6 is a flowchart diagram depicting a process for searching for a data product using a UPID, according to certain aspects of the present disclosure.

FIG. 6 is a flowchart diagram depicting a process 600 for searching for a data product using a UPID, according to certain aspects of the present disclosure. Process 600 can be performed on any suitable device, such as those disclosed elsewhere herein.

At block 602, a search UPID can be received. A search UPID can be a full UPID for a desired data product, or a partial UPID (e.g., one or more component codes of a UPID). A full UPID can be used as a search UPID when a particular data product is desired. A partial UPID can be used as a search UPID when any data products matching a particular set of requirements (e.g., the product attributes and/or service attributes indicated by the partial UPID) are desired, such as when comparing multiple providers' offerings of a particular data package.

In some cases, receiving the search UPID at block 602 can include generating a UPID from a data product or specification information, such as described with reference to process 300 of FIG. 3.

At block 604 a database of available data package(s) is accessed. The database of available packages can be a list of available UPIDs (e.g., all UPIDs available in a marketplace), which can include all UPIDs in use and/or all UPIDs to which the user has access (e.g., the list of all UPIDs which the user's company has purchased).

At block 606, a list of one or more potential data packages can be generated using the search UPID from block 602. Generating the list of potential data package(s) can include comparing the search UPID to the available UPIDs and identifying each available UPID that matches the search UPID (e.g., fully matches a full UPID or matches the present portions of a partial UPID).

When the search UPID is a full UPID, the list of potential data package(s) should be a single UPID. In such cases, the single UPID can be used as the selected data package at block 618.

In some cases, when the list of potential data packages contains multiple UPIDs, the data package to be used as the selected data package can be selected manually or automatically.

For manual selection, the list of potential data packages can be presented to a user and, at block 608, user input indicative of a selected data package out of the list of potential data packages. For example, the user can click on a single data package out of a list of potential data packages. That selected data package can be used as the selected data package at block 618.

For automatic selection, one or more product and/or service attributes can be extracted for each of the potential data package(s). These potential package attribute(s) for each of the potential data packages can then be used at block 612 to identify a selected data package out of the list of potential data packages. Identifying the selected data package at block 612 using the potential package attribute(s) can include comparing the potential package attribute(s) and ranking the potential package attribute(s). In some cases, identifying the selected data package at block 612 using the potential package attribute(s) can include matching one of the potential package attribute(s) with a user-preset desired attribute. For example, the user can pre-set that if the search returns multiple potential data packages, the process 600 should automatically select the potential data package with the largest geographical region. Any suitable product and/or service attribute can be used. In some cases, the potential product attribute extracted from the potential data packages can include attributes other than product/service attributes, such as pricing. In such cases, the data package selected at block 612 can automatically be the package with the least expensive price. Other comparisons and preset rules can be used.

In some cases, a determination can be made at block 614 that none of the available data package(s) from block 604 match with the search UPID from block 602. In such cases, process 600 can optionally end, returning that no matches are found. In some cases, process 600 can instead proceed to block 616, in which a combination package of two or more available data packages is identified that fit the criteria of the search UPID when the individual packages are combined. For example, if the search UPID identifies particular requirements and a geography attribute of the EMEA, but all of the available data packages that fit the particular requirements do not have a geography attribute of the EMEA, block 616 can include identifying the data packages that match the particular requirements and have geography attributes of Europe, Middle East, and Africa, thus covering all of the EMEA when combined. In such cases, each of those individual data packages that make up the combination package can be used as a selected data package at block 618.

At block 618, receipt of the selected data package(s) (e.g., from blocks 606, 608, 612, or 616) can be facilitated. Facilitating receipt of a selected data package can include initiating a transfer of the data package; granting of a license to the data package; granting permissions to access the data package; displaying the selected data package; displaying information on how to order the selected data package; displaying information on where to obtain the selected data package; or otherwise facilitating receipt of the selected data package. In some cases, other actions can be automatically taken in addition to or instead of facilitating receipt of the selected data package at block 618.

Process 600 is depicted with certain blocks in certain orders, although that need not always be the case. In some cases, process 600 can include fewer, additional, or different blocks, and in different orders.

Figure 7:
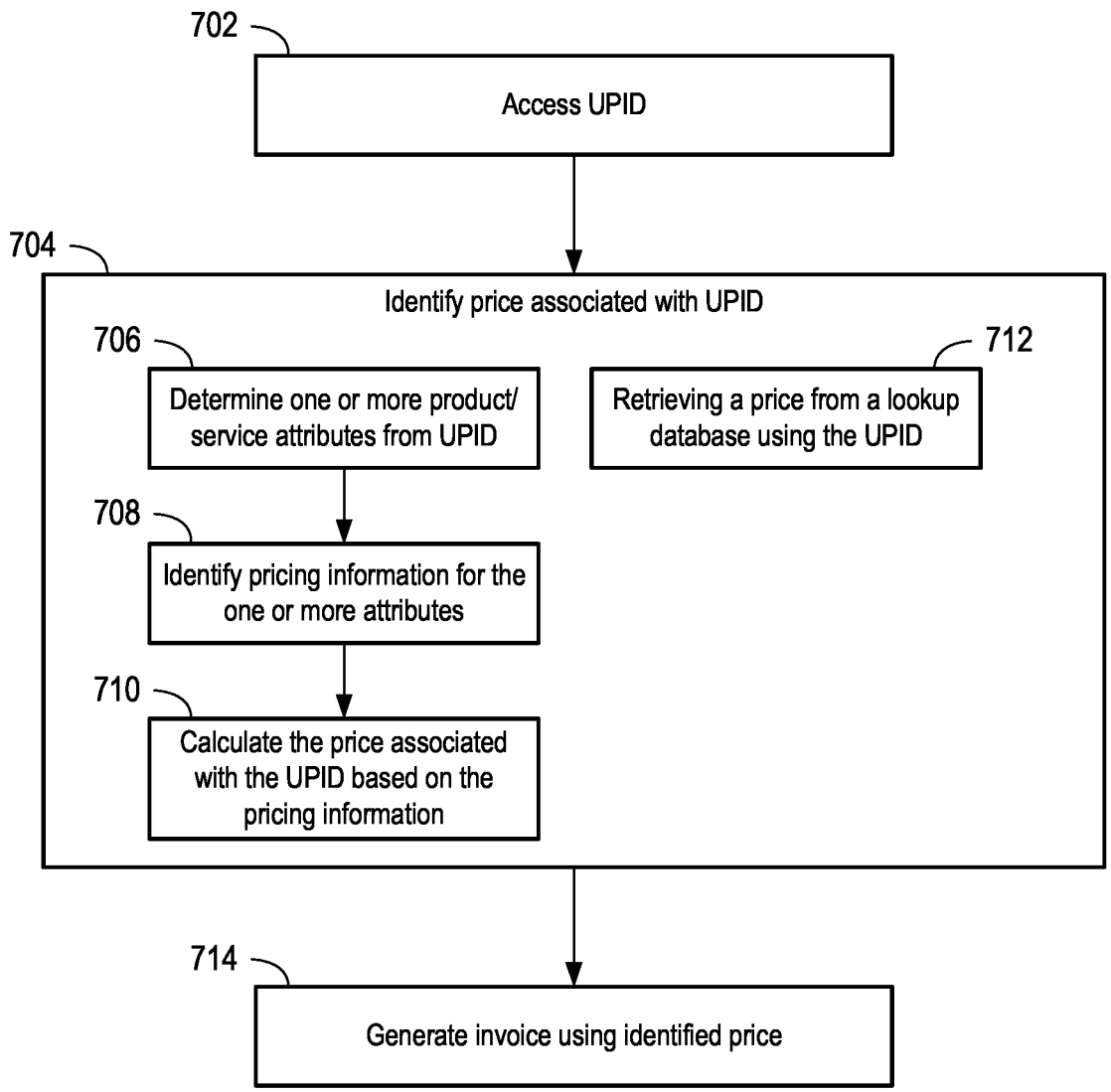
FIG. 7 is a flowchart diagram depicting a process for generating an invoice using a UPID, according to certain aspects of the present disclosure.

FIG. 7 is a flowchart diagram depicting a process 700 for generating an invoice using a UPID, according to certain aspects of the present disclosure. Process 700 can be performed on any suitable device, such as those disclosed elsewhere herein.

At block 702, a UPID can be accessed. Accessing the UPID can include accessing a UPID from a database (e.g., a database of provided packages or database of received packages) or otherwise receiving a UPID, such as described with reference to block 502 of FIG. 5.

At block 704, a price associated with the UPID can be identified using the UPID. In some cases, identifying a price associated with a UPID can include retrieving a price from a lookup database using the UPID at block 712. In such cases, each UPID can be associated with a specific price.

In some cases, identifying a price associated with the UPID at block 704 can include determining one or more product and/or service attributes from the UPID. At block 708, pricing information for the determined attribute(s) can then be identified, such as by retrieving such pricing information from a lookup database of attributes and associated prices. At block 710, a price associated with the UPID can be calculated based on the pricing information from block

708. In such cases, a price for a particular UPID can be automatically calculated based on one or more of the specific product attributes and/or service attributes defined by the UPID. For example, the pricing information for geographic region can define a particular value for each geographic region. This value can then be used in a calculation of the price of the UPID. As an example, pricing information for a geographic region can be a multiplier that is applied to the price of the UPID taking into account other attributes. Thus, for identical data packages that differ only in geographic region, a first data package indicating Belarus may have a first multiplier (e.g., 1.01) and a second data package indicating all of the EMEA may have a second multiplier (e.g., 5.25). In such an example, if the data packages each otherwise cost $100, the final, calculated price associated with the first data package would be $101 and the final, calculated price associated with the second data package would be $525.

At block 714, an invoice can be generated using the identified price. Generating an invoice using the identified price can include adding, as a line item to an invoice, the UPID from block 702 and the price identified at block 704.

Process 700 is depicted with certain blocks in certain orders, although that need not always be the case. In some cases, process 700 can include fewer, additional, or different blocks, and in different orders. For example, in some cases, instead of generating an invoice at block 714, an existing invoice or line item on an invoice can be approved, such as if the accessed UPID from block 702 is a UPID on the existing invoice. In such cases, if the UPID does not match, the invoice can be refuted.

Figure 8:
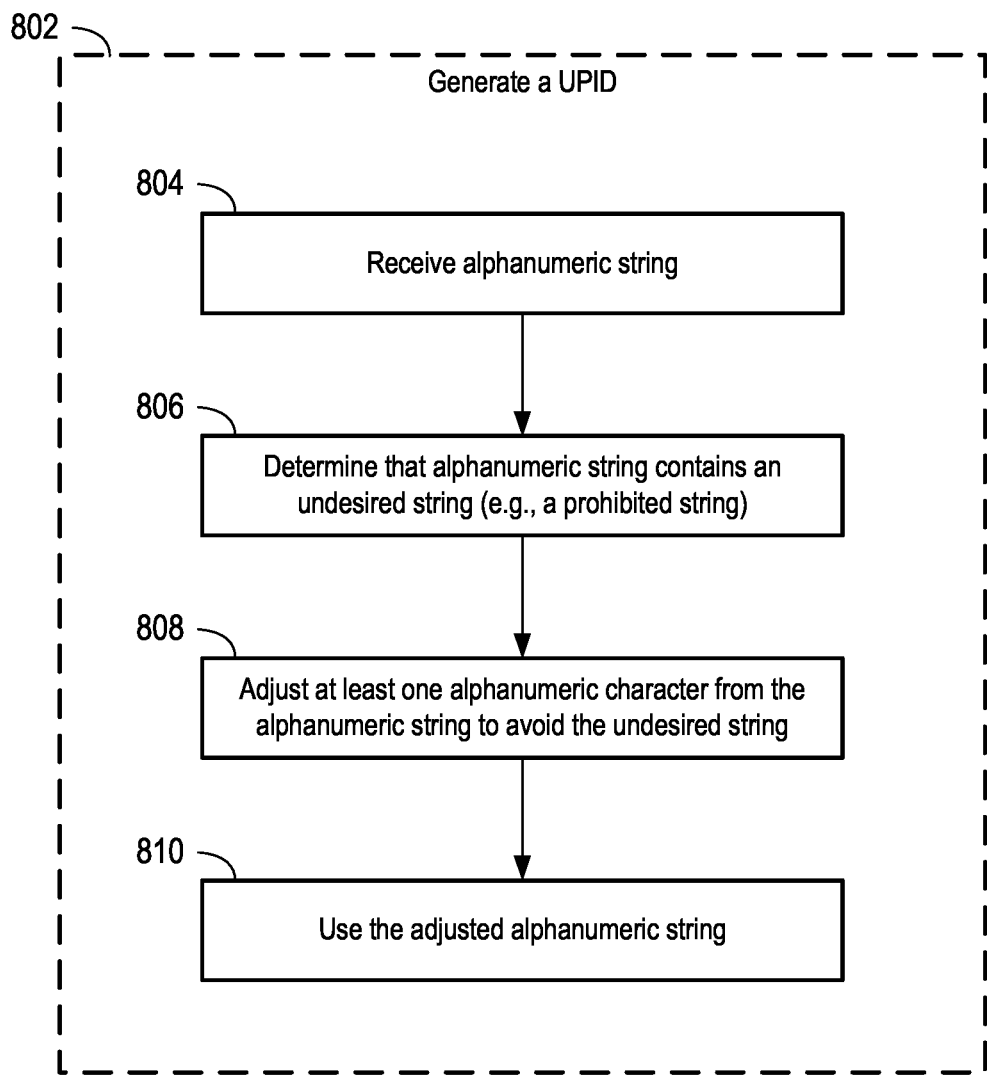
FIG. 8 is a flowchart diagram depicting a process for dynamically adjusting alphanumeric strings during generation of a UPID, according to certain aspects of the present disclosure.

FIG. 8 is a flowchart diagram depicting a process 800 for dynamically adjusting alphanumeric strings during generation of a UPID, according to certain aspects of the present disclosure. Process 800 can be performed on any suitable device, such as those disclosed elsewhere herein. Process 800 can be performed whenever new alphanumeric codes (e.g., component codes) are being created. In some cases, process 800 occurs as part of generating a UPID at block 802, such as described with reference to process 300 of FIG. 3. Process 800 can be especially useful when generating product attribute codes or service attribute codes that relate to a particular company, entity, region, or other entity or group of people that may not want to be associated with an undesired string.

At block 804, an alphanumeric string can be received. Receiving the alphanumeric string can include receiving a string that is intended to be used as a new code. In some cases, receiving the alphanumeric string can include building the string in accordance with the other codes of a particular product attribute or service attribute, such as following a certain pattern. In some cases, receiving the alphanumeric string can include building the string using one or more random or pseudorandom characters.

At block 806, a determination is made that the alphanumeric string contains an undesired string, such as a prohibited string. An undesired string or prohibited string is an undesired or prohibited sequence of characters. Such a sequence can be undesired or prohibited for any suitable reason, such as to avoid proper nouns, company names, obscenities, overly informal words, and the like. For example, a prohibited string may be "POOP."

Determining that the alphanumeric string contains the undesired string can include matching the alphanumeric string with a database of undesired strings. In some cases, alternate spellings and/or fuzzy logic can be used to catch alternative versions of an undesired string (e.g., "POOP" may be an alternate spelling for the prohibited string "POOP").

When it is determined that the alphanumeric string contains the undesired string, one or more alphanumeric characters can be changed to avoid the undesired string at block 808. In some cases, adjusting the alphanumeric string at block 808 can include additional iterations of blocks 804, 806, 808, with the altered string from the initial block 808 being analyzed again to ensure it does not contain an undesired string. In the above example, the prohibited string "POOP" may be altered to be "PTOP" or "EOOP" or "PO4P." In some cases, multiple alphanumeric characters can be changed. Altering alphanumeric characters at block 808 can include only altering those characters of an alphanumeric string that are able to be altered for the given attribute. For example, for a provider attribute code, the alphanumeric string may always begin with the first character of the provider's name, and thus that first character would not be adjusted at block 808.

At block 810, the adjusted alphanumeric string can be used.

Process 800 is depicted with certain blocks in certain orders, although that need not always be the case. In some cases, process 800 can include fewer, additional, or different blocks, and in different orders.

Figure 9:
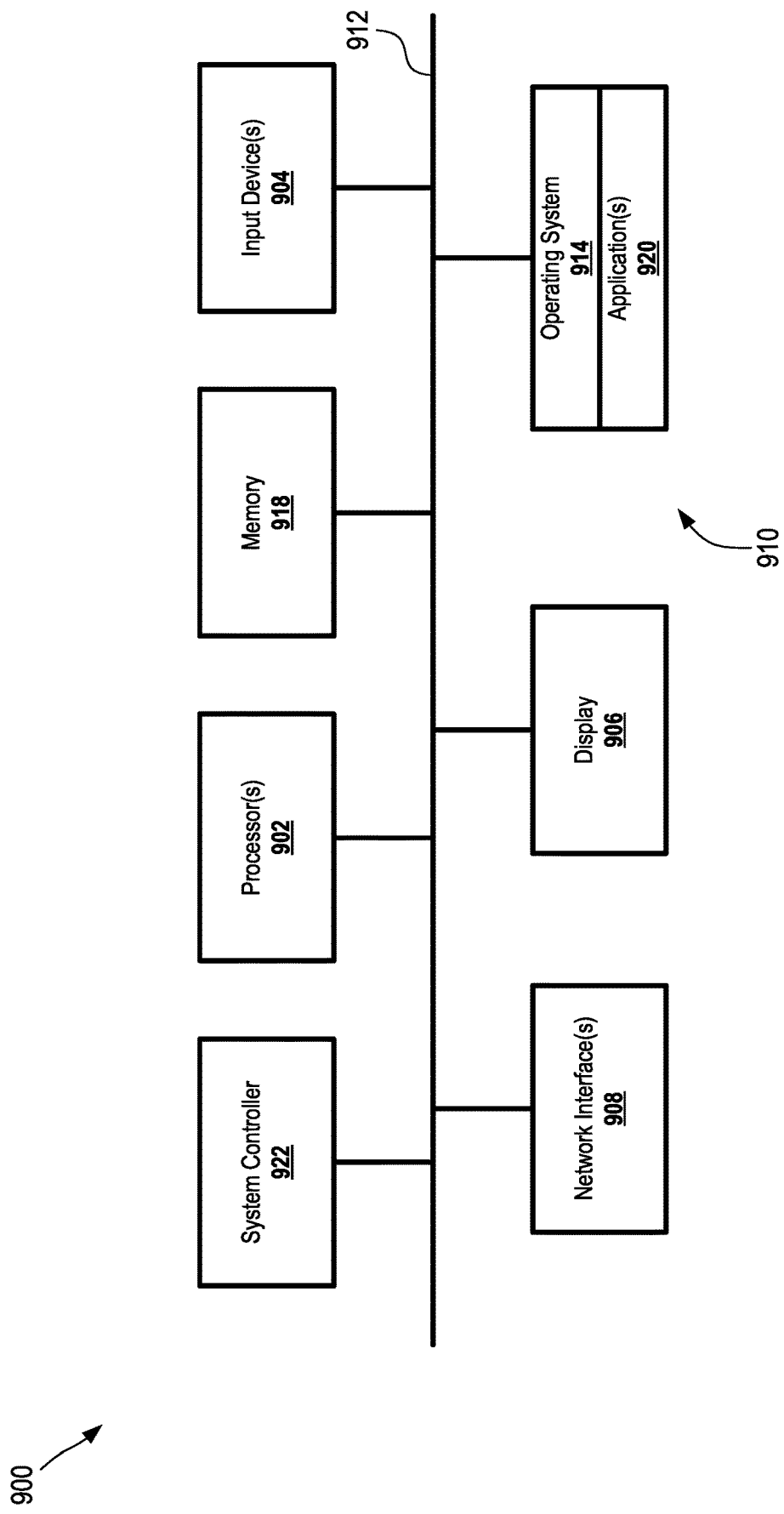
FIG. 9 is a block diagram depicting an example system architecture for implementing certain features and processes of the present disclosure.

FIG. 9 is a block diagram of an example system architecture 900 for implementing features and processes of the present disclosure, such as those presented with reference to processes 300, 400, 500, 600, 700, and 800 of FIGS. 3, 4, 5, 6, 7, and 8, respectively. The features and processes disclosed herein can be implemented using one or multiple instances of system architecture 900 (e.g., in a single instance example, a single computer can generate a UPID from a data package stored on the single computer; in a multiple instances example, a first computer may generate a UPID for a data package and transfer the UPID to a second computer, which decodes the UPID to identify attributes associated with the data package or generate an invoice associated with the UPID). The architecture 900 can be used to implement a server (e.g., a cloud-accessible server), a user device (e.g., a smartphone or personal computer), or any other suitable device for performing some or all of the aspects of the present disclosure. The architecture 900 can be implemented on any electronic device that runs software applications derived from compiled instructions, including without limitation personal computers, servers, smart phones, electronic tablets, game consoles, email devices, and the like. In some implementations, the architecture 900 can include one or more processors 902, one or more input devices 904, one or more display devices 906, one or more network interfaces 908, and one or more computer-readable mediums 910. Each of these components can be coupled by bus 912.

Display device 906 can be any known display technology, including but not limited to display devices using Liquid Crystal Display (LCD) or Light Emitting Diode (LED) technology. Processor(s) 902 can use any known processor technology, including but not limited to graphics processors and multi-core processors. Input device 904 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 912 can be any known internal or external bus technology, including but not limited to ISA, EISA, PCI, PCI Express, NuBus, USB, Serial ATA or FireWire.

Computer-readable medium 910 can be any medium that participates in providing instructions to processor(s) 902 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 910 can include various instructions for implementing operating system 914 and applications 920 such as computer programs. The operating system can be multi-user, multiprocessing, multitasking, multithreading, real-time and the like. The operating system 914 performs basic tasks, including but not limited to: recognizing input from input device 904; sending output to display device 906; keeping track of files and directories on computer-readable medium 910; controlling peripheral devices (e.g., storage drives, interface devices, etc.) which can be controlled directly or through an I/O controller; and managing traffic on bus 912. Computer-readable medium 910 can include various instructions for implementing firmware processes, such as a BIOS. Computer-readable medium 910 can include various instructions for implementing any of the processes described herein, including at least processes 300, 400, 500, 600, 700, and 800 of FIGS. 3, 4, 5, 6, 7, and 8, respectively.

Memory 918 can include high-speed random access memory and/or non-volatile memory, such as one or more magnetic disk storage devices, one or more optical storage devices, and/or flash memory (e.g., NAND, NOR). The memory 918 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 918 can store an operating system, such as Darwin, RTXC, LINUX, UNIX, OS X, WINDOWS, or an embedded operating system such as VxWorks.

System controller 922 can be a service processor that operates independently of processor 902. In some implementations, system controller 922 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

One or more elements or aspects or steps, or any portion(s) thereof, from one or more of any of the claims below can be combined with one or more elements or aspects or steps, or any portion(s) thereof, from one or more of any other of the claims below, or combinations thereof, to form one or more additional implementations and/or claims of the present disclosure.

What is claimed is:

1. A method comprising:
   receiving specification information for a data package, the data package including i) a data product; ii) services associated with a data product; or iii) a combination of i and ii;
   determining a plurality of product attributes based at least in part on the specification information;
   identifying, for each of the plurality of product attributes, an alphanumeric product attribute code;
   generating a search uniform package identifier (UPID) for the data package based at least in part on the plurality of alphanumeric product attribute codes, wherein the search UPID is alphanumeric, the search UPID including a plurality of component codes concatenated in a preset order, the plurality of component codes including the plurality of alphanumeric product attribute codes such that the search UPID includes each of the plurality of alphanumeric product attribute codes;
   accessing a list of available data packages, each of the available data packages being associated with a respective available data package UPID, each respective available data package UPID including a respective plurality of component codes concatenated in the preset order;
   determining that none of the available data package UPIDs include the search UPID;
   identifying a subset of data packages from the list of available data packages based at least in part on the search UPID, the subset of data packages collectively satisfying the specification information associated with the search UPID; and
   combining the identified subset of data packages into a combination package, the combination package satisfying the specification information associated with the search UPID.

2. The method of claim 1, further comprising:
   determining a provider identifier based at least in part on the specification information, the provider identifier indicative of a provider of the data package; and
   identifying an alphanumeric provider code based at least in part on the provider identifier, wherein generating the search UPID is further based at least in part on the alphanumeric provider code, and wherein the search UPID includes the alphanumeric provider code and the plurality of alphanumeric product attribute codes.

3. The method of claim 2, further comprising:
   determining hierarchy information associated with the provider, the hierarchy information indicative of the hierarchical position of the provider with respect to one or more corporate affiliates of the provider; and
   identifying an alphanumeric hierarchy code based at least in part on the hierarchy information, wherein generating the search UPID is further based at least in part on the alphanumeric hierarchy code, and wherein the search UPID includes the alphanumeric provider code and the hierarchy code.

4. The method of claim 2, wherein the plurality of product attributes includes a product code, wherein, for each of a plurality of potential providers of potential data products, the product code is uniquely indicative of a specific data product of the given potential provider.

5. The method of claim 1, wherein the plurality of product attributes includes i) a delivery method code, wherein the delivery method code is indicative of a storage form for delivery of the data product, a route of delivery for delivery of the data product, or a combination thereof; ii) a product delivery frequency code, wherein the product delivery frequency code is indicative of a frequency of delivery or a delay of delivery associated with the data product; iii) a solution code, wherein the solution code is indicative of a targeted use associated with the data product; iv) a classification code, wherein the classification code is indicative of one or more targeted use cases associated with the solution code; v) a geography code, wherein the geography code is indicative of a geographical region associated with the data product; or vi) any combination of i-v.

6. The method of claim 1, wherein the data package is associated with one or more service attributes, wherein the method further comprises:
   determining the one or more service attributes based at least in part on the specification information; and
   identifying, for each of the one or more service attributes, an alphanumeric service attribute code, wherein generating the search UPID is further based at least in part on the one or more alphanumeric service attribute codes, and wherein the search UPID includes the one or more alphanumeric service attribute codes and the plurality of alphanumeric product attribute codes.

7. The method of claim 6, wherein the one or more service attributes includes: i) a data source attribute indicative of an entity that provided the data package; ii) a data originator attribute indicative of an original creator of the data package; iii) a content frequency attribute indicative of at least one of timing and frequency of update of content of the data package; iv) a metadata presence attribute indicative of whether additional metadata is included with the data package; v) one or more modifying attributes indicative of supplemental characteristics associated with the data package; or vi) any combination of i-v.

8. The method of claim 1, further comprising:
   facilitating receipt of the combination package in response to combining the identified subset of data packages into the combination package.

9. The method of claim 1, wherein receiving the specification information includes:
   receiving an open text input; and
   parsing the open text input to extract the specification information.

10. The method of claim 1, further comprising generating an invoice based at least in part on the search UPID, wherein generating the invoice includes:
    accessing the search UPID;
    identifying a price associated with the search UPID; and
    preparing the invoice using the price associated with the search UPID.

11. The method of claim 10, wherein identifying the price associated with the search UPID includes:
    identifying, for one or more of the plurality of product attributes, pricing information associated with the respective product attribute; and
    calculating the price associated with the search UPID based at least in part on the pricing information for each of the one or more of the plurality of product attributes.

12. The method of claim 1, wherein receiving the specification information occurs in response to receiving a user input, and wherein the method further comprises presenting the search UPID using an output device coupled to the computing device.

13. The method of claim 1, wherein at least one of the plurality of product attributes includes a set of component attributes, wherein identifying the alphanumeric product attribute code for the at least one of the plurality of product attributes includes identifying a code indicative of the set of component attributes.

14. The method of claim 1, wherein at least one of the plurality of product attributes includes a set of component attributes, wherein identifying the alphanumeric product attribute code for the at least one of the plurality of product attributes includes:
    determining a count of component attributes in the set of component attributes;
    determining a basket indicator code based at least in part on the count of component attributes;
    determining a component attribute code for each component attribute of the set of component attributes; and
    determining the alphanumeric product attribute code by concatenating the basket indicator code and each of the component attribute codes.

15. A system, comprising:
one or more data processors; and
a non-transitory computer-readable storage medium containing instructions which, when executed on the one or more data processors, cause the one or more data processors to perform operations including:
   receiving specification information for a data package, the data package including i) a data product; ii) services associated with a data product; or iii) a combination of i and ii;
   determining a plurality of product attributes based at least in part on the specification information;
   identifying, for each of the plurality of product attributes, an alphanumeric product attribute code;
   generating a search uniform package identifier (UPID) for the data package based at least in part on the plurality of alphanumeric product attribute codes, wherein the search UPID is alphanumeric, the search UPID including a plurality of component codes concatenated in a preset order, the plurality of component codes including the plurality of alphanumeric product attribute codes such that the search UPID includes each of the plurality of alphanumeric product attribute codes;
   accessing a list of available data packages, each of the available data packages being associated with a respective available data package UPID, each respective available data package UPID including a respective plurality of component codes concatenated in the preset order;
   determining that none of the available data package UPIDs include the search UPID;
   identifying a subset of data packages from the list of available data packages based at least in part on the search UPID, the subset of data packages collectively satisfying the specification information associated with the search UPID; and
   combining the identified subset of data packages into a combination package, the combination package satisfying the specification information associated with the search UPID.

16. The system of claim 15, wherein the operations further include:
    determining a provider identifier based at least in part on the specification information, the provider identifier indicative of a provider of the data package;
    identifying an alphanumeric provider code based at least in part on the provider identifier, wherein generating the search UPID is further based at least in part on the alphanumeric provider code, and wherein the search UPID includes the alphanumeric provider code and the plurality of alphanumeric product attribute codes;
    determining hierarchy information associated with the provider, the hierarchy information indicative of the hierarchical position of the provider with respect to one or more corporate affiliates of the provider; and
    identifying an alphanumeric hierarchy code based at least in part on the hierarchy information, wherein generating the search UPID is further based at least in part on the alphanumeric hierarchy code, and wherein the search UPID includes the alphanumeric provider code and the hierarchy code..

17. The system of claim 16, wherein the plurality of product attributes includes i) a delivery method code, wherein the delivery method code is indicative of a storage form for delivery of the data product, a route of delivery for delivery of the data product, or a combination thereof;
  ii) a product delivery frequency code, wherein the product delivery frequency code is indicative of a frequency of delivery or a delay of delivery associated with the data product; iii) a solution code, wherein the solution code is indicative of a targeted use associated with the data product; iv) a classification code, wherein the classification code is indicative of one or more targeted use cases associated with the solution code; v) a geography code, wherein the geography code is indicative of a geographical region associated with the data product; or vi) any combination of i-v.

18. A computer-program product tangibly embodied in a non-transitory machine-readable storage medium, including instructions configured to cause a data processing apparatus to perform operations including:
  receiving specification information for a data package, the data package including i) a data product; ii) services associated with a data product; or iii) a combination of i and ii;
  determining a plurality of product attributes based at least in part on the specification information;
  identifying, for each of the plurality of product attributes, an alphanumeric product attribute code;
  generating a search uniform package identifier (UPID) for the data package based at least in part on the plurality of alphanumeric product attribute codes, wherein the search UPID is alphanumeric, the search UPID including a plurality of component codes concatenated in a preset order, the plurality of component codes including the plurality of alphanumeric product attribute codes such that the search UPID includes each of the plurality of alphanumeric product attribute codes;
  accessing a list of available data packages, each of the available data packages being associated with a respective available data package UPID, each respective available data package UPID including a respective plurality of component codes concatenated in the preset order;
  determining that none of the available data package UPIDs include the search UPID;
  identifying a subset of data packages from the list of available data packages based at least in part on the search UPID, the subset of data packages collectively satisfying the specification information associated with the search UPID; and
  combining the identified subset of data packages into a combination package, the combination package satisfying the specification information associated with the search UPID.

19. The computer-program product of claim 18, wherein the operations further include:
  determining a provider identifier based at least in part on the specification information, the provider identifier indicative of a provider of the data package;
  identifying an alphanumeric provider code based at least in part on the provider identifier, wherein generating the search UPID is further based at least in part on the alphanumeric provider code, and wherein the search UPID includes the alphanumeric provider code and the plurality of alphanumeric product attribute codes;
  determining hierarchy information associated with the provider, the hierarchy information indicative of the hierarchical position of the provider with respect to one or more corporate affiliates of the provider; and
  identifying an alphanumeric hierarchy code based at least in part on the hierarchy information, wherein generating the search UPID is further based at least in part on the alphanumeric hierarchy code, and wherein the search UPID includes the alphanumeric provider code and the hierarchy code.

20. The computer-program product of claim 18, wherein the plurality of product attributes includes i) a delivery method code, wherein the delivery method code is indicative of a storage form for delivery of the data product, a route of delivery for delivery of the data product, or a combination thereof; ii) a product delivery frequency code, wherein the product delivery frequency code is indicative of a frequency of delivery or a delay of delivery associated with the data product; iii) a solution code, wherein the solution code is indicative of a targeted use associated with the data product; iv) a classification code, wherein the classification code is indicative of one or more targeted use cases associated with the solution code; v) a geography code, wherein the geography code is indicative of a geographical region associated with the data product; or vi) any combination of i-v.

* * * * *